US012779417B2

United States Patent
(12) United States Patent
Shen et al.

(10) Patent No.: US 12,779,417 B2
(45) Date of Patent: Nov. 3, 2026

(54) CONVEYING APPARATUS AND TONING APPARATUS

(71) Applicant: ZHENGZHOU SANHUA TECHNOLOGY INDUSTRY CO LTD, Xingyang City (CN)

(72) Inventors: Ruhua Shen, Xingyang City (CN); Weipeng Kong, Xingyang City (CN); Kunkun Zhang, Xingyang City (CN)

(73) Assignee: Zhengzhou Sanhua Technology Industry Co Ltd (CN)

( * ) Notice: Subject to any disclaimer, the term of this patent is extended or adjusted under 35 U.S.C. 154(b) by 902 days.

(21) Appl. No.: 17/925,388

(22) PCT Filed: May 20, 2021

(86) PCT No.: PCT/CN2021/094953
§ 371 (c)(1),
(2) Date: Nov. 15, 2022

(87) PCT Pub. No.: WO2022/007511
PCT Pub. Date: Jan. 13, 2022

(65) Prior Publication Data

US 2023/0182096 A1 Jun. 15, 2023

(30) Foreign Application Priority Data

Jul. 10, 2020 (CN) ......................... 202010664389.5

(51) Int. Cl.
*B01F 35/71* (2022.01)
*B01F 33/84* (2022.01)
(Continued)

(52) U.S. Cl.
CPC ........ *B01F 35/71715* (2022.01); *B01F 33/84* (2022.01); *B01F 35/717613* (2022.01); *B01F 2101/30* (2022.01); *B65G 47/842* (2013.01)

(58) Field of Classification Search
CPC ......... B25B 5/08; B25B 1/08; Y10T 24/3969; Y10T 24/3996; B65G 17/323;
(Continued)

(56) References Cited

U.S. PATENT DOCUMENTS 3,456,814 A * 7/1969 Bautz .................. B21D 43/055 414/751.1
3,757,961 A * 9/1973 Jacobs .................. B65G 25/02 198/740
(Continued)

FOREIGN PATENT DOCUMENTS

CN 109046172 A 12/2018
CN 208342617 U 1/2019
(Continued)

OTHER PUBLICATIONS

Notice of Acceptance of AU 2021304052, dated Jun. 4, 2024.
(Continued)

*Primary Examiner* — Mahdi H Nejad
(74) *Attorney, Agent, or Firm* — Barnes & Thornburg LLP

(57) ABSTRACT

Provided are conveying apparatus and tinting apparatus. Conveying apparatus includes: first guide rail, including first section and second section connected to each other; compression module, movable along first guide rail and provided on first guide rail in fitted manner, compression module including base and compression assembly having adjustable relative positions, compression assembly being provided on base, gap existing between compression assembly and base, compression module having to-be-assembled state and compression state, and when compression module is in compression state, gap being narrowed to tightly clamp clamped member; and limiting structure, during compression module moves from first section to second section, state of compression module being switched by means of limiting struc-
(Continued)

ture, when compression module is located on first section, compression module being in to-be-assembled state, and when compression module is located on second section, compression module being in compression state.

6 Claims, 16 Drawing Sheets

(51) Int. Cl.
*B01F 101/30* (2022.01)
*B65G 47/86* (2006.01)

(58) Field of Classification Search
CPC .... B65G 2201/0244; B65G 2201/0247; B65G 47/842
USPC .................. 269/234, 138; 24/136 R, 115 M; 198/468.2, 803.3, 803.7, 850
See application file for complete search history.

(56) References Cited

U.S. PATENT DOCUMENTS

| | | | | |
|---|---|---|---|---|
| 4,640,406 | A * | 2/1987 | Willison | B41F 17/14 198/470.1 |
| 7,055,676 | B2 | 6/2006 | Hartness et al. | |
| 7,055,677 | B2 * | 6/2006 | Hartness | B65G 47/842 198/803.7 |
| 2005/0103602 | A1 | 5/2005 | Hartness et al. | |
| 2013/0111849 | A1 | 5/2013 | Bush et al. | |
| 2013/0270403 | A1 | 10/2013 | Cimaglio | |

FOREIGN PATENT DOCUMENTS

| | | | | |
|---|---|---|---|---|
| CN | 208800938 | U | 4/2019 | |
| CN | 111071743 | A | 4/2020 | |
| CN | 111804233 | A | 10/2020 | |
| CN | 212383650 | U | 1/2021 | |
| ES | 2224786 | A1 * | 3/2005 | B67C 3/24 |
| ES | 22247861 | | 3/2005 | |
| JP | 2006306462 | | 11/2006 | |
| JP | 2007511444 | | 5/2007 | |
| JP | 5790315 | B2 | 10/2015 | |
| KR | 20-1996-0033711 | | 11/1996 | |
| KR | 20120097521 | | 9/2012 | |
| KR | 10-2015-0107353 | | 9/2015 | |
| WO | 2020/057458 | | 3/2020 | |
| WO | 2022/007511 | | 1/2022 | |

OTHER PUBLICATIONS

Decision to Grant IN 202247076622, dated Mar. 27, 2024.
Decision to Grant JP 2022-566288, dated Mar. 8, 2024.
Decision to Grant KR 5-2017-033673-6, dated Jun. 27, 2025.
Examination Report No. 1 for AU 2021304052, dated Oct. 9, 2023.
Office Action for BR112022026107-1, dated May 20, 2021.
Office Action for EP 21 838 703.3, dated Oct. 2, 2023.
Office Action for JP 2022-566288, dated Nov. 21, 2023.
Office Action for KR 9 5 2024-095649746, dated Nov. 8, 2024.
Examination report No. 2 for AU 2021304052, dated Apr. 2, 2024.
International Search Report corresponding to PCT/CN2021/094953 dated Aug. 18, 2021.
Written Opinion corresponding to PCT/CN2021/094953 dated Aug. 13, 2021.

* cited by examiner

CONVEYING APPARATUS AND TONING APPARATUS

This utility patent application is a U.S. National Phase of International Patent Application No. PCT/CN2021/094953 filed May 20, 2021, which claims the benefit of priority to Chinese Patent Application No. 202010664389.5, filed on Jul. 10, 2020, the disclosure of each of which are incorporated herein by reference in their entirety.

TECHNICAL FIELD

The present disclosure relates to the technical field of automatic matching of automobile refinishing paints, and particularly relates to a conveying apparatus and a color matching apparatus (tinting apparatus/toning apparatus).

BACKGROUND ART

One of the common methods in color matching before painting automobile refinishing paints is to find the color card with the same color by comparing the color card with the automobile color, find the color masterbatch ratio of the color card number and the weight formula of each color masterbatch from the color matching software database in the computer according to the color card number, and manually weigh, mix, and stir the required multiple color masterbatches according to the formula to prepare the automobile refinishing paint (hereinafter referred to as automobile paint for short) with the same color as the color card. However, the labor efficiency is low, and the automobile refinishing paint prepared according to the color card usually has certain deviation from the automobile color and needs to be further manually adjusted, which is laborious and has relatively high technical requirements for a color matching worker, and requires an experienced color matching worker to prepare the automobile paint with the same color.

In the prior art, there is also a method for finding the paint formula when leaving the factory according to the model or paint code of the automobile or measuring the automobile surface paint by using an optical instrument (spectrophotometer) to obtain the paint formula. This method of obtaining the formula can be suitable for the analysis of most automobile surface paints, is relatively accurate, and reduces the error of color between the automobile paint prepared by the formula obtained according to the model or paint code and the actual automobile paint. But even so, the previous statistics showed that a considerable ratio of automobile surface paints still have chromatic aberration after one time of color matching, and further manual color-matching correction is also needed. Therefore, current color matching of automobile refinishing paints has high requirements for manual work and relies heavily on it, while the efficiency of manual color matching is low, especially, some paint mixing shops have a large amount of color matching per day, which can reach dozens or hundreds types, and one color matching worker cannot complete it, and some shops even need two or four color matching workers. Even so, because of the high labor intensity, poor environment (colors are stuck everywhere, even on people's bodies), and accumulation over a long time for improving the skill, people are unwilling to do the job of color matching workers. On the other hand, it is also very difficult to recruit an excellent color matching worker, because no one is willing to do it if the salary is low. However, today's color matching technicians are necessary, but for a paint mixing shop with a small amount of color matching business or the color matching is only an auxiliary business (for example, some 4S shops), the income from paint mixing cannot cover the salary of a color matching worker. Therefore, if there is a device that has a low manufacturing cost, automatically and accurately matches the amounts of masterbatches of each color, and can achieve the purposes of improving efficiency, reducing technical requirements for color matching, and reducing the labor costs, such device is marketable.

In fact, in recent years, some enterprises have developed automatic color mixers for automobile refinishing paints. But they fail to form stable products to put into the market.

As we all know, the existing mature and general color matching methods of automobile paint in the world are all carried out by the way of weight ratio, and the color masterbatch is manually poured out from the paint bucket to be weighed for color matching. That is to say, according to the weight requirements of required color masterbatches for the color matching, the color masterbatch is poured out manually from the color masterbatch bucket with a paste cover on an upper part through a paste outlet nozzle on the paste cover. The weight of required color masterbatch for color matching is weighed on the electronic scale. In this way, the color masterbatch for color matching in each formula is poured out of the color masterbatch bucket and weighed to achieve the required weight. Then, the color masterbatches for color matching are stirred and mixed to complete the color matching of the required color paint. The paste cover has the functions of stirring and manually controlling the pouring of color masterbatch. At present, the color matching formulas of manufacturers (such as Xinjin, DuPont, PPG, BASF) in the world that make the color masterbatches for color matching of automobile refinishing paints are all designed according to the weight ratio.

There are two advantages of using the weight ratio for manual paint pouring and color matching:

1. it is convenient to pour out the required amount of color masterbatch from the color masterbatch bucket, and it is also convenient to control the pouring amount: as long as it is observed that the required weight on the weighing scale is close, a pouring speed of the color masterbatch is gradually slowed down by hand to make the weight get close to the required pouring weight slowly, until the required color masterbatch weight is finally reached, pouring out the masterbatch is stopped. Other color masterbatches for color matching are also poured and weighed according to the same method;
2. several color masterbatches that are needed for the color matching can be all poured into one container and directly stirred evenly: for example, if three color masterbatches are needed to match one color, and the weight of each color masterbatch is 1.1 g for color masterbatch A, 2.2 g for color masterbatch B, and 3.3 g for color masterbatch C, an empty bucket may be put on the electronic scale, and the weight is reset. The color masterbatch A is poured into the empty bucket until the electronic scale shows 1.1 g; the electronic scale is reset, and then the color masterbatch B is poured until the electronic scale shows 2.2 g; then, the electronic scale is reset, and the color masterbatch C is poured until the electronic scale shows 3.3 g. Finally, the three color masterbatches are evenly stirred with a stirring ruler to complete the color matching.

The use of weight for color matching is the first natural choice in the history of color matching. In order to avoid that the ratio of color masterbatches for color matching cannot be accurately known and the required amounts of color masterbatches cannot be accurately controlled by empirical color matching, the most convenient weight ratio method for accurate color matching is proposed on the basis of empirical color matching.

In theory, it is also valid to use volume ratio for color matching. However, the volume ratio color matching method established in theory is difficult to realize in practice. The main reason is that paint residues at a paint outlet of the metering device for refinishing paint volume affect the amount actually injected into a vessel, thus causing deviations in the actual amount of refinishing paint obtained. For example, there are several ways to get the required volume of color masterbatch for color matching by the volume ratio matching method: idea 1 is to pour the color masterbatch into a measuring cup manually, and observe and control the amount of poured color masterbatch with human eyes according to the volume scale of the measuring cup. However, there is a problem. Due to the characteristics of color paint, the precision of determining the volume of the color masterbatch by observing the volume scale of the measuring cup with human eyes cannot reach the required precision of 0.1 g by weight, and especially, when a large amount of color paint is used, the volume of the measuring cup will be larger, and the cross-sectional area of the measuring cup will be larger, so the error of determining whether the color masterbatch reaches the specified position of the volume scale by human eyes will be greater, which simply cannot meet the color matching accuracy requirement of 0.1 g. Moreover, the inaccurate manual color matching method by volume is much more difficult and cumbersome in actual operation than the weight-ratio color matching method, such that it cannot realize effective color matching; idea 2 is specific gravity cup method: it is also difficult to obtain the required volume in practical application because of the wall-hanging residue of color masterbatch and the discontinuity of volume measurement; idea 3 is a method of manual volume measuring and injecting by using an injecting tube: because of the extracted color masterbatch hanging at an injecting tube head, it will cause accuracy error, it is laborious and not environmentally friendly to remove the hanging color masterbatch, and if it is not cleaned, it will flow to an outlet of the needle tube head and affect the error guarantee below 0.1 g. Similarly, it is very hard to manually dispense viscous color masterbatch, and people with little strength cannot even push it. Although reducing a tube diameter of the dispensing tube can reduce a dispensing force and improve the single push-out accuracy, for accurate dispensing of a large amount of color masterbatch, it needs to be extracted from a color masterbatch container for many times, the hanging color masterbatch at an injecting nozzle must be removed for each extraction, and the increase of times of extraction will increase the cumulative error, in this case, the error of 0.1 g is more difficult to control. Moreover, it is much more complicated than the weight ratio method currently used. The color matching industry will of course choose the weight ratio method which is simple and easy to realize, and will not choose the volume ratio method which is laborious and difficult to guarantee the accuracy for color matching.

After the appearance of the weight-ratio color matching method, the technicians in the industry did not consider using volume ratio to realize color matching. Because from the past to the present, after analyzing various influencing factors in the above, people in the industry decided that it could not replace the weight-ratio color mixing and color matching, which was imperceptibly in the minds of the people in the industry and had become a technical prejudice.

Our company has broken through the technical prejudice of the industry in recent years, and developed a reflux pump valve structure, so that there is substantially no paint residue and drying on a paint nozzle after the automobile refinishing paint is dispensed and the refinishing paint pumped out by an automobile refinishing paint volume pump can be completely injected into a collecting vessel, realizing the full-automatic color matching of the automobile refinishing paint in the true sense, and developing an automatic color matching apparatus for volumetric metering of the automobile refinishing paint. A frame of the color mixer is provided with a plurality of color masterbatch bucket mounting stations. The color masterbatch buckets on the frame are generally arranged in two types, one type is that the color masterbatch buckets are arranged in a divergent shape along a radius with a rotating shaft as a center, such as CN 201821510123.X, and the second type is that the color masterbatch buckets are arranged in a rectangular shape, such as 201821510138.6. Both apparatuses are well received and approved by large customers. However, the two color masterbatch bucket arrangement forms must cooperate with a complex movement mechanism to complete a material receiving action. Therefore, the cost of the apparatus is increased, and further due to a large volume and a wide space occupied, for some small and medium-sized stores, it is not suitable for purchasing or using the apparatus. Moreover, when the color masterbatch buckets need to be loaded on and unloaded from the frame, after the color masterbatch buckets move to the assembling position and stop stably, the color masterbatch buckets need to be disassembled and assembled by using a dedicated dismantling mechanism, then the loading and unloading inefficiency is low. A semi-automatic color matching apparatus for the automobile refinishing paint, having a simple structure, high efficiency, accurate matching, and low cost and being capable of reducing the labor cost and the operation technique of operators, is more needed for small and medium-sized stores to solve the above problems.

SUMMARY

The present disclosure provides a conveying apparatus and a color matching apparatus, which facilitate placing a clamped member in a color matching process so as to solve the problem of low loading and unloading efficiency of the color matching apparatus in the related art.

According to one aspect of the present disclosure, a conveying apparatus is provided. The conveying apparatus includes: a first guide rail, including a first section and a second section connected to each other; a compression module, which can be provided on the first guide rail in a manner of being movably fitted along the first guide rail, wherein the compression module includes a base and a compression assembly with adjustable relative positions, the compression assembly is provided on the base, the compression assembly and the base have a gap therebetween, the compression module has a to-be-assembled state and a compression state which are oppositely arranged, and when the compression module is in the compression state, the gap is decreased so as to clamp a clamped member; and a limiting structure, configured to adjust the gap between the compression assembly and the base, in a process that the compression module moves from the first section to the second section, the state of the compression module is switched through the limiting structure, and when the compression module is located at the first section, the compression module is in the to-be-assembled state, and when the compression module is located at the second section, the compression module is in the compression state.

Further, the limiting structure includes a second guide rail and a limiting member, the first guide rail and the second guide rail are provided in the same direction, the second guide rail is provided with a first sliding groove, the limiting member is provided in the first sliding groove, the base is provided on the first guide rail, and the limiting member is connected to the compression assembly.

Further, the first sliding groove is provided on a side wall of the second guide rail, and a height of the first sliding groove relative to the first section is greater than a height of the first sliding groove relative to the second section.

Further, the compression assembly includes: a first compression member, located on one side of the base, and the first compression member and the base having a gap therebetween; a connecting member, provided on the base in a penetrating manner, one end of the connecting member being connected to the first compression member, and a second compression member, located on the other side of the base, wherein the other end of the connecting member is connected to the second compression member, and the limiting member is provided on the second compression member.

Further, the first compression member and the connecting member have an adjusting structure therebetween, and the adjusting structure is configured to adjust the maximum gap between the first compression member and the base.

Further, the adjusting structure includes: a waist-shaped hole, provided on the connecting member, wherein the waist-shaped hole extends along a lengthwise direction of the connecting member; a fixing member, passing through the waist-shaped hole and connected to the first compression member; and an adjusting member, wherein the connecting member has a mounting hole, and an extending direction of the mounting hole is the same as an extending direction of the connecting member, the adjusting member is provided in the mounting hole in a penetrating manner, an end portion of the adjusting member abuts against the fixing member so as to limit a relative position of the fixing member in the waist-shaped hole.

Further, the base is provided thereon with a second sliding groove, and the base is clamped in the first guide rail through the second sliding groove.

According to another aspect of the present disclosure, a color matching apparatus is provided, wherein the color matching apparatus includes: a platform; a conveying apparatus, wherein a compression module on the conveying apparatus is configured to fix a color masterbatch bucket, and the conveying apparatus is the conveying apparatus according to any one of claims to; and a first driving portion, provided on the platform, wherein the first driving portion is in drive connection with the compression module so as to drive the compression module to move relative to the platform, and the compression module has an assembling position and a liquid outlet position relative to the platform.

Further, the color matching apparatus further includes a housing, the housing is covered on the platform, the housing has an operation door provided corresponding to an assembling position, and the operation door has an open state and a closed state provided relative to the housing.

Further, the color matching apparatus further includes: a second driving portion, movably provided on the housing; a rotating shaft, rotatably provided on the housing, the rotating shaft being in drive connection with the operation door; and a connecting rod mechanism, wherein one end of the connecting rod mechanism is hinged to the second driving portion, and the other end of the connecting rod mechanism is connected to the rotating shaft.

Further, the connecting rod mechanism includes a first connecting rod and a second connecting rod hinged to each other, one end of the first connecting rod is hinged to a pushing member of the second driving portion, and one end of the second connecting rod is fixedly connected to the rotating shaft, and the color matching apparatus further includes: a third connecting rod, wherein one end of the third connecting rod is fixedly connected to the rotating shaft, and the other end of the third connecting rod is hinged to the operation door; a first sliding rail, provided on the housing; and a first sliding block, slidably provided on the first sliding rail, wherein the first sliding block is hinged to the operation door, and in a process of movement of the operation door, the first sliding block and the first sliding rail cooperate with each other so as to limit the operation door to move along a preset path.

Further, the color matching apparatus further includes: a pumping mechanism, connected to the color masterbatch bucket, wherein the pumping mechanism is configured to pump out paint in the color masterbatch bucket, the platform has a liquid outlet window, the liquid outlet window is provided corresponding to the liquid outlet position; and a third driving portion, provided on the platform, wherein the third driving portion is in drive connection with the pumping mechanism, and the third driving portion is configured to drive the pumping mechanism to operate.

Further, the color masterbatch bucket is connected to a volumetric metering pump through a valve body, a bucket cover is provided on the color masterbatch bucket, a pouring port is provided on the bucket cover, a pouring port cover is provided on the pouring port, the pouring port cover is slidably provided on the pouring port, the pouring port cover is connected to a clasp, a compression spring making the pouring port cover in a closed state is provided between the clasp and the bucket cover, a connecting member is provided between an upper part of the color masterbatch bucket and the volumetric metering pump so that the volumetric metering pump forms a handle of the color masterbatch bucket, the clasp is located on one side of the bucket cover close to the volumetric metering pump, and a stirring device is provided in the color masterbatch bucket.

The technical solution of the present disclosure is applied. The conveying apparatus includes the first guide rail, a compression module, and a limiting structure. The compression module can be provided on the first guide rail in a manner of being movably fitted along the first guide rail, the compression module includes a base and a compression assembly with adjustable relative positions, the compression assembly is provided on the base, the compression assembly and the base have a gap therebetween, and the limiting structure is configured to adjust the gap between the compression assembly and the base. In the above, the compression module has the to-be-assembled state and the compression state which are oppositely arranged, and when the compression module is in the compression state, the gap is decreased so as to clamp the clamped member. Specifically, the first guide rail includes the first section and the second section connected to each other, when the compression module is located at the first section, the compression module is in the to-be-assembled state, in this case, the clamped member can be assembled, and when the compression module is located at the second section, the compression module is in the compression state, in this case, the clamped member is fixedly provided on the compression module, facilitating transporting the clamped member. By providing the limiting structure, and adjusting the gap between compression assembly and the base by the limiting structure, in the process that the compression module moves from the first section to the second section, the state of the compression module can be switched through the limiting structure, thus facilitating the disassembling and assembling of the clamped member, and improving the disassembling and assembling efficiency.

BRIEF DESCRIPTION OF DRAWINGS

The accompanying drawings are used to provide a further understanding of the present disclosure and form a part of the present disclosure, and the illustrative embodiments of the present disclosure and the description thereof are used to explain the present disclosure and do not constitute an improper limitation of the present disclosure. In the accompanying drawings.

Figure 1:
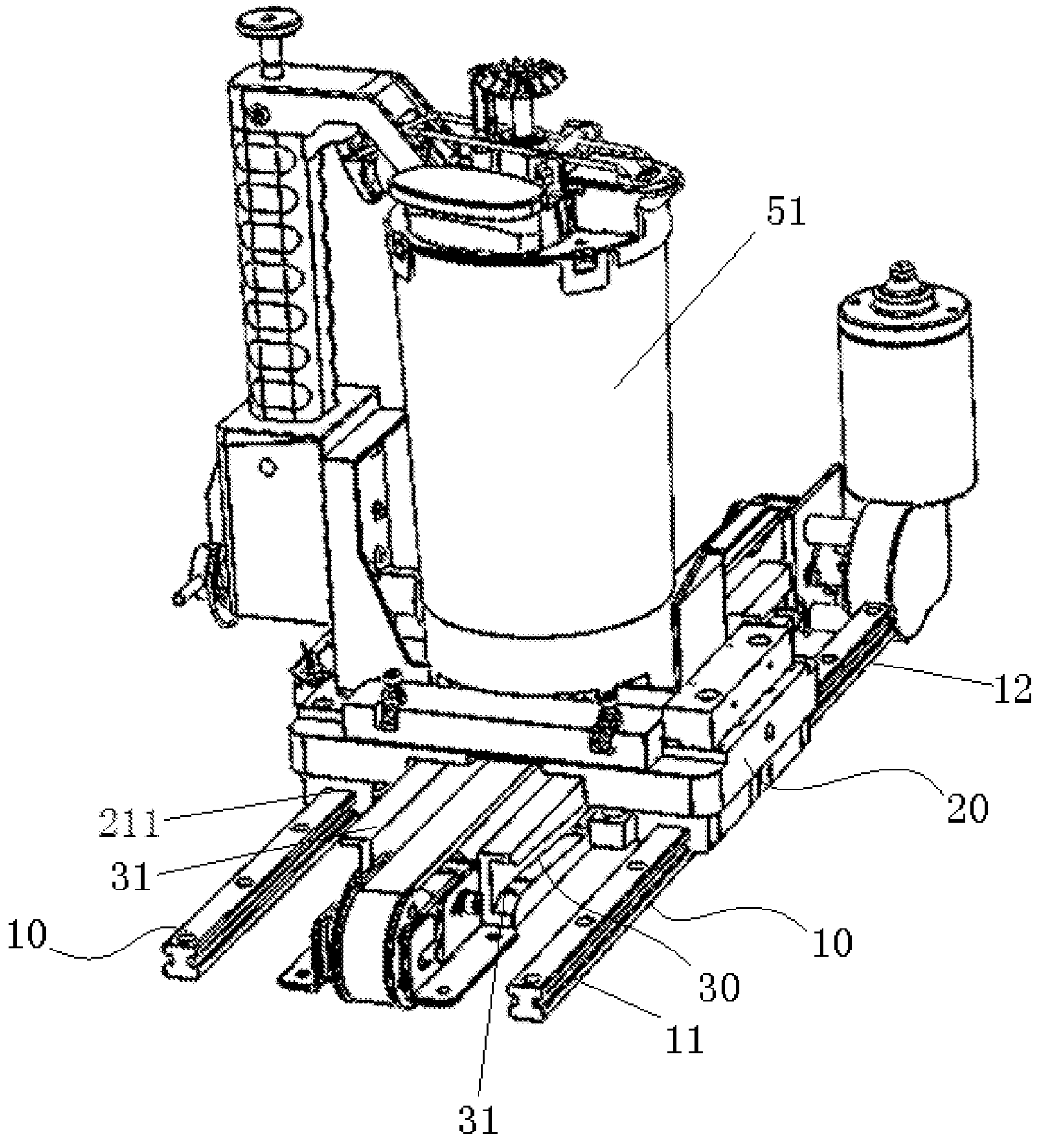
FIG. 1 shows a structural schematic view of a conveying apparatus provided according to an embodiment of the present disclosure.
Figure 2:
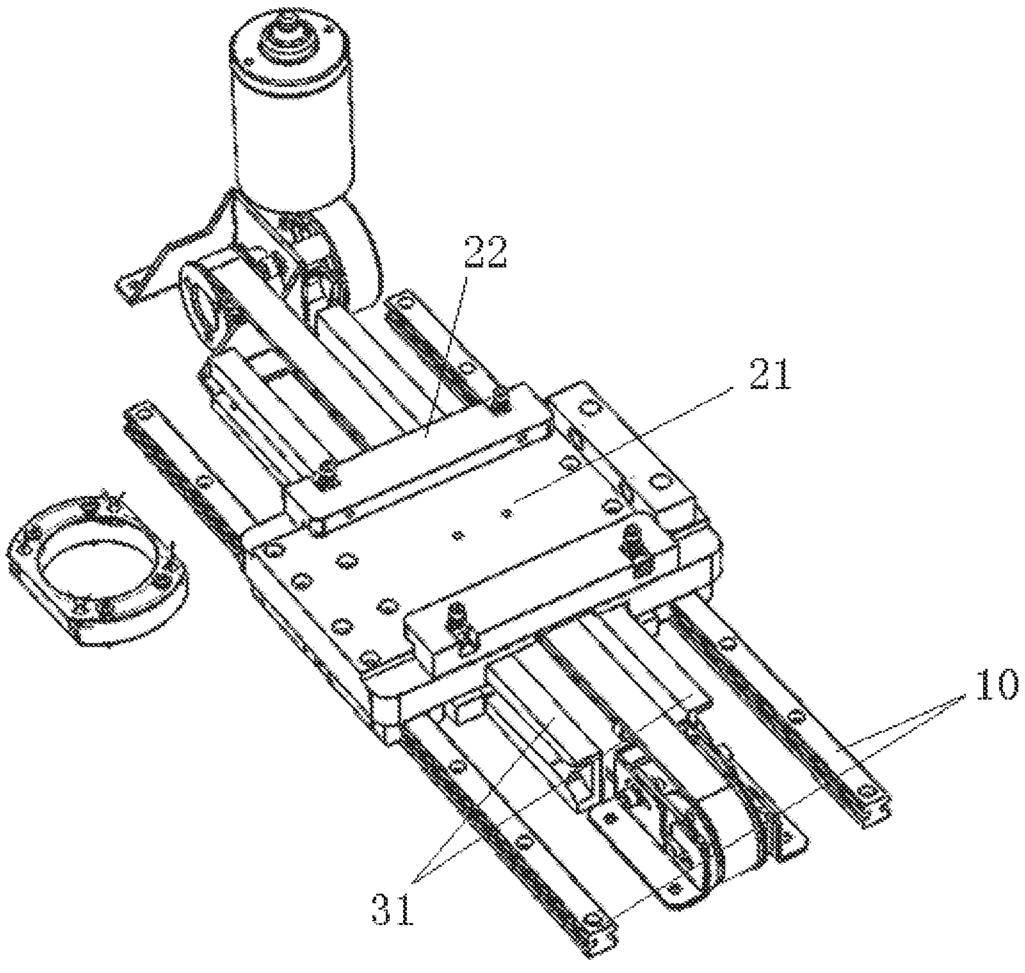
FIG. 2 shows a structural schematic view of the conveying apparatus according to an embodiment of the present disclosure, without being installed with a color masterbatch bucket.

In the above, the above accompanying drawings include the following reference signs:

10. first guide rail; 11. first section; 12. second section; 20. compression module; 21. base; 211. second sliding groove; 22. compression assembly; 221. first compression member; 222. connecting member; 223. second compression member; 224. third compression member; 23. adjusting structure; 231. waist-shaped hole; 232. fixing member; 233. adjusting member; 30. limiting structure; 31. second guide rail; 311. first sliding groove; 32. limiting member; 40. platform; 41. liquid outlet window; 50. conveying apparatus; 51. color masterbatch bucket; 52. valve body; 53. valve body lever; 60. first driving portion; 61. first driving wheel assembly; 62. drive motor assembly; 63. first synchronous belt; 70. housing; 71. operation door; 81. second driving portion; 811. second sliding rail; 812. pushing member; 82. rotating shaft; 83. connecting rod mechanism; 831. first connecting rod; 832. second connecting rod; 84. third connecting rod; 85. first sliding rail; 86. first sliding block; 90. pumping mechanism; 100. third driving portion; 101. lever; 102. linear driving mechanism; 103. pull rod head baffle; 111. assembling position sensor; 112. liquid outlet position sensor; 113. bucket detection sensor; 120. receiving device.

DETAILED DESCRIPTION OF EMBODIMENTS

The technical solutions in the embodiments of the present disclosure will be described clearly and completely below in conjunction with the accompanying drawings in the embodiments of the present disclosure, and apparently, some but not all embodiments of the present disclosure are described. The following description of at least one exemplary embodiment is merely illustrative in nature and is in no way intended to limit the present disclosure and application or use thereof. All of other embodiments obtained by those of ordinary skill in the art based on the embodiments of the present disclosure without any creative effort shall fall within the scope of protection of the present disclosure.

As shown in FIG. 1 to FIG. 6, an embodiment of the present disclosure provides a conveying apparatus, wherein the conveying apparatus includes a first guide rail 10, a compression module 20, and a limiting structure 30, the compression module 20 can be provided on the first guide rail 10 in a manner of being movably fitted along the first guide rail 10, the compression module 20 includes a base 21 and a compression assembly 22 with adjustable relative positions, the compression assembly 22 is provided on the base 21, the compression assembly 22 and the base 21 have a gap therebetween, the limiting structure 30 is configured to adjust the gap between the compression assembly 22 and the base 21, and the gap is configured to accommodate a clamped portion of a clamped member. In the present embodiment, the compression module 20 has a to-be-assembled state and a compression state which are oppositely arranged, wherein when the compression module 20 is in the to-be-assembled state, the gap is increased so as to release the clamped member, and when the compression module 20 is in the compression state, the gap is decreased so as to clamp the clamped member. Specifically, the first guide rail 10 includes a first section 11 and a second section 12 connected to each other, and in a process that the compression module 20 moves from the first section 11 to the second section 12, the state of the compression module 20 is switched through the limiting structure 30, and when the compression module 20 is located at the first section 11, the compression module 20 is in the to-be-assembled state, and when the compression module 20 is located at the second section 12, the compression module 20 is in the compression state.

The conveying apparatus provided in the present embodiment is applied. By providing the limiting structure 30, and adjusting the gap between compression assembly 22 and the base 21 by the limiting structure 30, in the process that the compression module 20 moves from the first section 11 to the second section 12, the state of the compression module 20 can be switched through the limiting structure 30, thus facilitating the disassembling and assembling of the clamped member, without the need of waiting the clamped member to move to the assembling position and stop stably and then using a dedicated dismantling mechanism for disassembling and assembling, which can improve the disassembling and assembling efficiency.

In the above, the limiting structure only needs to be able to switch the state of the compression module 20 in the process that the compression module 20 moves from the first section 11 to the second section 12.

Figure 5:
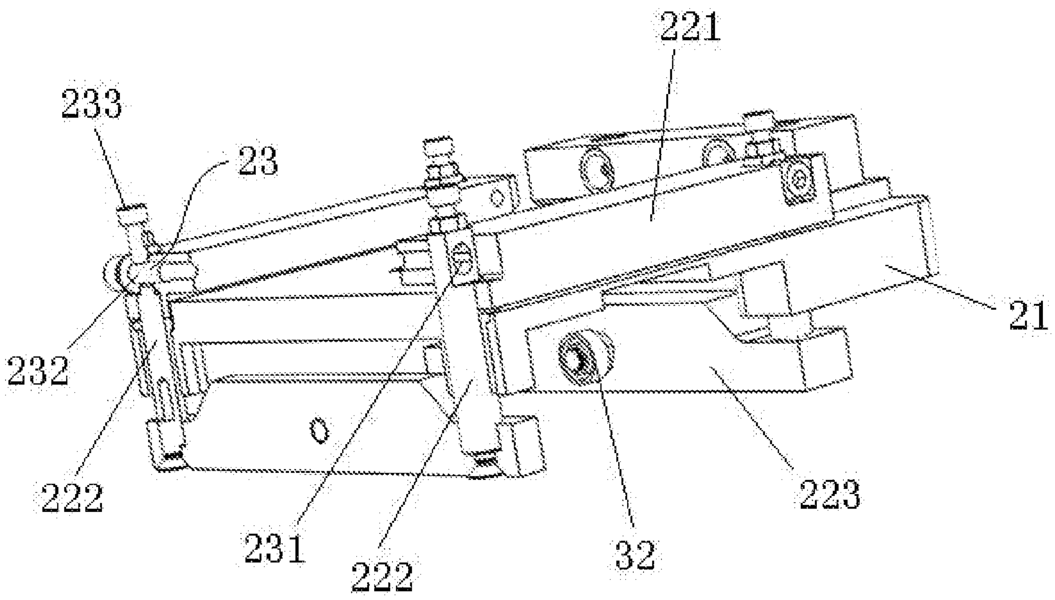
FIG. 5 shows a structural schematic view of an adjusting structure of the compression module in FIG. 1.
Figure 6:
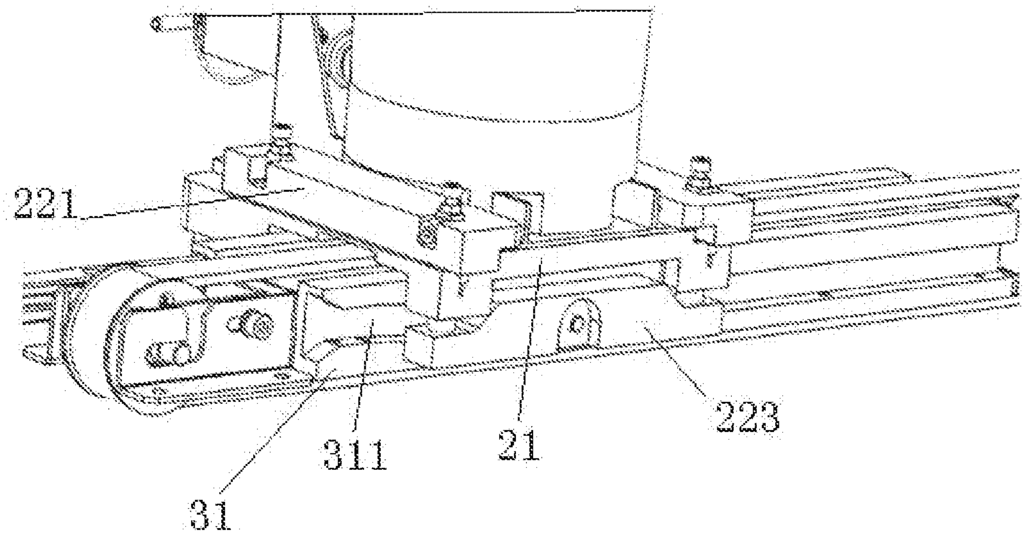
FIG. 6 shows a structural schematic view of a limiting structure of the conveying apparatus provided according to an embodiment of the present disclosure.

As shown in FIG. 5 and FIG. 6, the limiting structure 30 includes a second guide rail 31 and a limiting member 32, the first guide rail 10 and the second guide rail 31 are provided in the same direction, and the compression module 20 can slide along an extending direction of the first guide rail and the second guide rail. In the above, the second guide rail 31 is provided with a first sliding groove 311, the limiting member 32 is provided in the first sliding groove 311, the base 21 is provided on the first guide rail 10, the limiting member 32 is connected to the compression assembly 22, and the limiting member 32 is matched with the first sliding groove 311 so as to adjust the gap between the compression assembly 22 and the base 21. In the process that the compression module slides relative to the first guide rail and the second guide rail, the limiting member 32 will move in the first sliding groove 311, and by adjusting a position of the limiting member in the first sliding groove, a position of the limiting member relative to the base 21 in a height direction is adjusted, and further the gap between the compression assembly 22 and the base 21 can be adjusted.

In the present embodiment, the first guide rail 10 and the second guide rail 31 are provided side by side, and the compression module 20 can slide along the extending direction of the first guide rail and the second guide rail, so that the area occupied by the apparatus can be reduced, and the integration level of the apparatus can be improved. In other embodiments, the first guide rail 10 and the second guide rail 31 may be provided in series on a line, but by using this arrangement manner, the length dimension of the apparatus will be increased.

In the present embodiment, the first sliding groove 311 is provided on a side wall of the second guide rail 31, and a height of the first sliding groove 311 relative to the first section 11 is greater than a height of the first sliding groove 311 relative to the second section 12. In the process that the compression module slides relative to the first guide rail and the second guide rail, as the height of the first sliding groove 311 relative to the first section 11 is higher than the height of the first sliding groove 311 relative to the second section 12, and the limiting member is provided on the compression assembly, when the compression module 20 is located at the first section 11, under the supporting effect of the limiting member, the gap between the compression assembly 22 and the base 21 will be increased, in this case, the compression module 20 is in the to-be-assembled state, and when the compression module 20 is located at the second section 12, under the pulling effect of the limiting member, the gap between the compression assembly 22 and the base 21 will be decreased, in this case, the compression module 20 is in the compression state. In the present embodiment, the limiting member is a bearing, so that a friction force when the limiting member slides in the first sliding groove can be reduced.

In other embodiments, the first sliding groove can be provided on a top wall of the second guide rail, and by adjusting a groove depth of the first sliding groove, the gap between the compression assembly 22 and the base 21 can also be adjusted by matching the limiting member and the first sliding groove in the process that the compression module slides relative to the first guide rail and the second guide rail.

Figure 3:
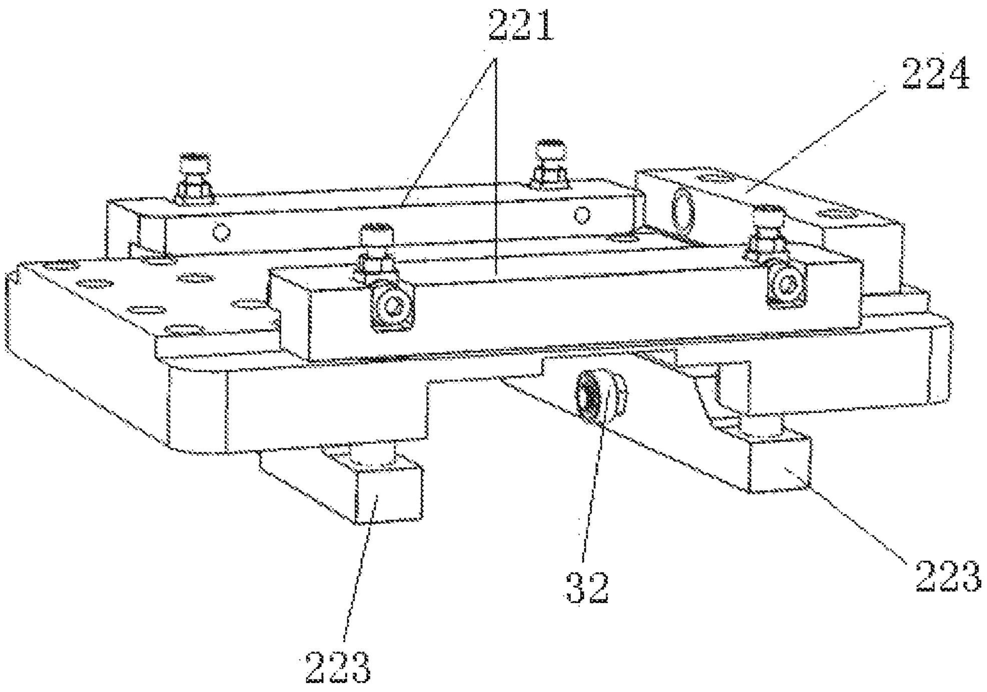
FIG. 3 shows a structural schematic view of a compression module in FIG. 1.
Figure 4:
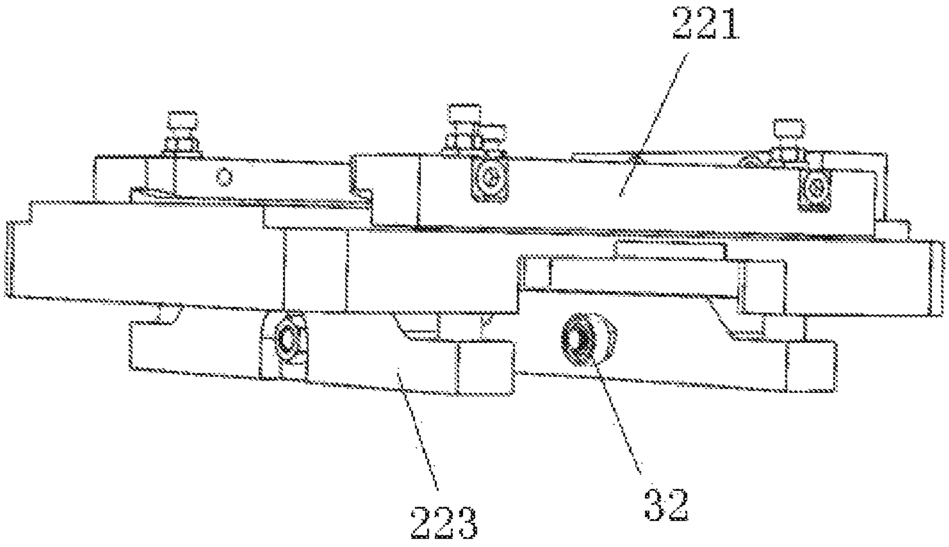
FIG. 4 shows a structural schematic view of the compression module in FIG. 1 from another angle of view.

As shown in FIG. 3 and FIG. 4, the compression assembly 22 includes a first compression member 221, a connecting member 222, and a second compression member 223, wherein the first compression member 221 is located on one side of the base 21, the second compression member 223 is located on the other side of the base 21, the connecting member 222 is provided on the base 21 in a penetrating manner, one end of the connecting member 222 is connected to the first compression member 221, and the other end of the connecting member 222 is connected to the second compression member 223. In the present embodiment, the base 21 is provided with a through hole, the connecting member 222 penetrates through the through hole, there is a gap between an outer wall of the connecting member 222 and an inner wall of the through hole, and the connecting member is not connected to the inner wall of the through hole. In the above, the first compression member 221 and the base 21 have a gap therebetween, the gap is configured to accommodate the clamped portion of the clamped member, and the limiting member 32 is provided on the second compression member 223. In the process that the compression module slides relative to the first guide rail and the second guide rail, with the change of height of the first sliding groove, the second compression member drives the first compression member to move relative to the base by using the connecting member. Specifically, when the compression module 20 is located at the first section 11, under the supporting effect of the second compression member and the connecting member, the first compression member 221 will move in a direction getting away from the base 21, and the gap between the compression assembly 22 and the base 21 will be increased, in this case, the compression module 20 is in the to-be-assembled state, and when the compression module 20 is located at the second section 12, under the pulling effect of the second compression member and the connecting member, the first compression member 221 will move in a direction getting close to the base 21, and the gap between the compression assembly 22 and the base 21 will be decreased, in this case, the compression module 20 is in the compression state.

In order to increase the application range of the conveying apparatus, the first compression member 221 and the connecting member 222 have an adjusting structure 23 therebetween, and the adjusting structure 23 is configured to adjust the maximum gap between the first compression member 221 and the base 21. By adjusting the maximum gap between the first compression member and the base, the gap can be adapted to clamped members of different dimensions.

As shown in FIG. 5, the adjusting structure 23 includes a waist-shaped hole 231, a fixing member 232, and an adjusting member 233, wherein the waist-shaped hole 231 is provided on the connecting member 222, and the fixing member 232 passes through the waist-shaped hole 231 and is connected to the first compression member 221. In the above, the waist-shaped hole 231 extends along a lengthwise direction of the connecting member 222, and the waist-shaped hole 231 can provide a moving space for the fixing member 232. Specifically, the connecting member 222 has a mounting hole, and an extending direction of the mounting hole is the same as an extending direction of the connecting member 222, and by making the adjusting member 233 penetrate into the mounting hole and making an end portion of the adjusting member 233 abut against the fixing member 232, a relative position of the fixing member 232 in the waist-shaped hole 231 can be limited, further the maximum gap between the first compression member and the base can be limited. In the present embodiment, both the fixing member 232 and the adjusting member 233 are bolts, and have the advantages of simple structure, easy maintenance, and low cost.

In the present embodiment, the compression assembly 22 includes two first compression members and two second compression members, the first compression member and the second compression member both extend along a horizontal direction, and the first compression member and the second compression member are provided vertically. In the above, the compression assembly includes four connecting members, two ends of each first compression member are both connected to one connecting member, and two ends of each second compression member are both connected to one connecting member. Specifically, projections of the two first compression members and the two second compression members in a horizontal direction form a rectangular structure, and four connecting members are respectively located at four corners of the rectangular structure, in this way, the connection stability of the first compression member and the second compression member and the stability when the first compression member moves relative to the base 21 can be improved.

As shown in FIG. 1, in the present embodiment, the base 21 is provided thereon with a second sliding groove 211, and the base 21 is clamped in the first guide rail 10 through the second sliding groove 211. Specifically, the base 21 can only slide on the first guide rail 10 along the second sliding groove 211, and the second sliding groove 211 and the first guide rail are matched so that the base is limited on the first guide rail.

In the present embodiment, the conveying apparatus includes two first guide rails and two second guide rails, wherein the two second guide rails are arranged side by side, and the two first guide rails are provided side by side outside the two second guide rails.

As shown in FIG. 3, in the present embodiment, the conveying apparatus further includes a third compression member 224, the third compression member 224 is located at one end of a first compression block, and the third compression member 224 is configured to limit a position of the clamped member on the base, preventing the clamped member from falling off along a plane direction of the base.

In the present embodiment, the clamped member is a color masterbatch bucket 51, the color masterbatch bucket 51 is connected to a volumetric metering pump (a pumping mechanism 90) via a valve body 52, a bucket cover is provided on the color masterbatch bucket 51, a feeding port, a feeding port cover, and a pouring port are provided on the bucket cover, a pouring port cover is provided on the pouring port, a stirring device is provided in the color masterbatch bucket 51, a lug is provided at the bottom of the color masterbatch bucket 51, and the lug is configured for sliding connection with the compression module 20. Specifically, the gap between the first compression block and the base forms a clamping groove structure (snap-fitting structure), wherein the clamping groove structure can be combined with the lug on the color masterbatch bucket 51, so that quick separation and snap-fitting between the color masterbatch bucket and the compression module are realized. In the above, the valve body is provided with a paste outlet nozzle, the valve body is provided with a valve body lever, an injecting channel is provided in the valve body, and the valve body lever 53 can rotate in the valve body so that the injecting channel is in communication with the paste outlet nozzle or closed.

Specifically, the volumetric metering pump is a piston pump. The volumetric metering pump may be a volumetric pump, such as a piston pump or a plunger pump, driven by a stepping motor or a direct current motor. At present, in the field of color matching of automobile refinishing paint, various color pastes are matched according to the weight ratio. This method requires an additional weighing device such as an electronic scale. In the present disclosure, the color paste is dispensed according to volume by the volumetric metering pump, and the automobile refinishing paints achieving a predetermined effect can be prepared with various color pastes according to the volume ratio, without the weighing device.

Specifically, the valve body is provided with the paste outlet nozzle, the paste outlet nozzle is located at the lowest position of the valve body, the valve body has on-off and commutation functions, the valve body is provided with a valve body lever, an injecting channel is provided in the valve body, the injecting channel is connected to the color masterbatch bucket 51 and the volumetric metering pump, and the valve lever can rotate in the valve body to enable the injecting channel to be in communication with the paste outlet nozzle or closed.

In the present embodiment, a corrosion-resistant sealing ring is provided between the color masterbatch bucket 51 and the bucket cover, and the sealing ring is made of corrosion-resistant material, so as to be adapted to the corrosiveness of the color masterbatches of the automobile paint.

In addition, in other embodiments, structures on the first guide rail and the second guide rail may be integrated onto one guide rail, and the compression and conveying principle provided in the present embodiment can also be realized by using the first guide rail or the second guide rail alone, so that the structure of the apparatus can be simplified, and the integration level of the apparatus is improved.

As shown in FIG. 7 to FIG. 18, another embodiment of the present disclosure provides a color matching apparatus, wherein the color matching apparatus includes a platform 40, a conveying apparatus 50, and a first driving portion 60, a compression module 20 on the conveying apparatus 50 is configured to fix a color masterbatch bucket 51, the conveying apparatus 50 is the conveying apparatus provided above, and the conveying apparatus is configured to convey the color masterbatch bucket 51. In the above, the first driving portion 60 is provided on the platform 40, the first driving portion 60 is in drive connection with the compression module 20 so as to drive the compression module 20 to move relative to the platform 40, and the compression module 20 has an assembling position and a liquid outlet position relative to the platform 40. When the compression module 20 is located at the assembling position, the compression module 20 is in a to-be-assembled state, and when the compression module 20 is located at the liquid outlet position, the compression module 20 is in a compression state. In the present embodiment, the color matching apparatus further includes a control mechanism, and the control mechanism controls electrical components in the color matching apparatus, such as a sensor, a motor, or an air cylinder and other power sources.

In the present embodiment, the first driving portion 60 includes a first driving wheel assembly 61, a first driven wheel assembly, a drive motor assembly 62, and a first synchronous belt 63, the first driving wheel assembly and the first driven wheel assembly are respectively located at two ends of the first guide rail 10, and the first synchronous belt is erected between the first driving wheel assembly and the first driven wheel assembly, a belt body of the first synchronous belt is connected to the compression module 20, the drive motor assembly includes a drive motor and a speed reducer, and the drive motor assembly drives the driving wheel in the first driving wheel assembly to rotate. In the above, the first synchronous belt is located between the two second guide rails. In the present embodiment, the first driving wheel assembly and the first driven wheel assembly are each composed of a support and guide wheels provided on the support, and the guide wheels can be divided into a driving wheel and a driven wheel according to the power source.

In the above, the first driving portion 60 functions to bring the compression module 20 from the assembling position to the liquid outlet position according to a certain working condition and procedure in accordance with a program in a control mechanism, therefore, the first driving portion 60, which also may be a linear moving air cylinder or oil cylinder assembly, is connected to the compression module 20 through an air cylinder rod, and drives the compression module 20 to move on the first guide rail 10 through the cylinder rod.

Figure 7:
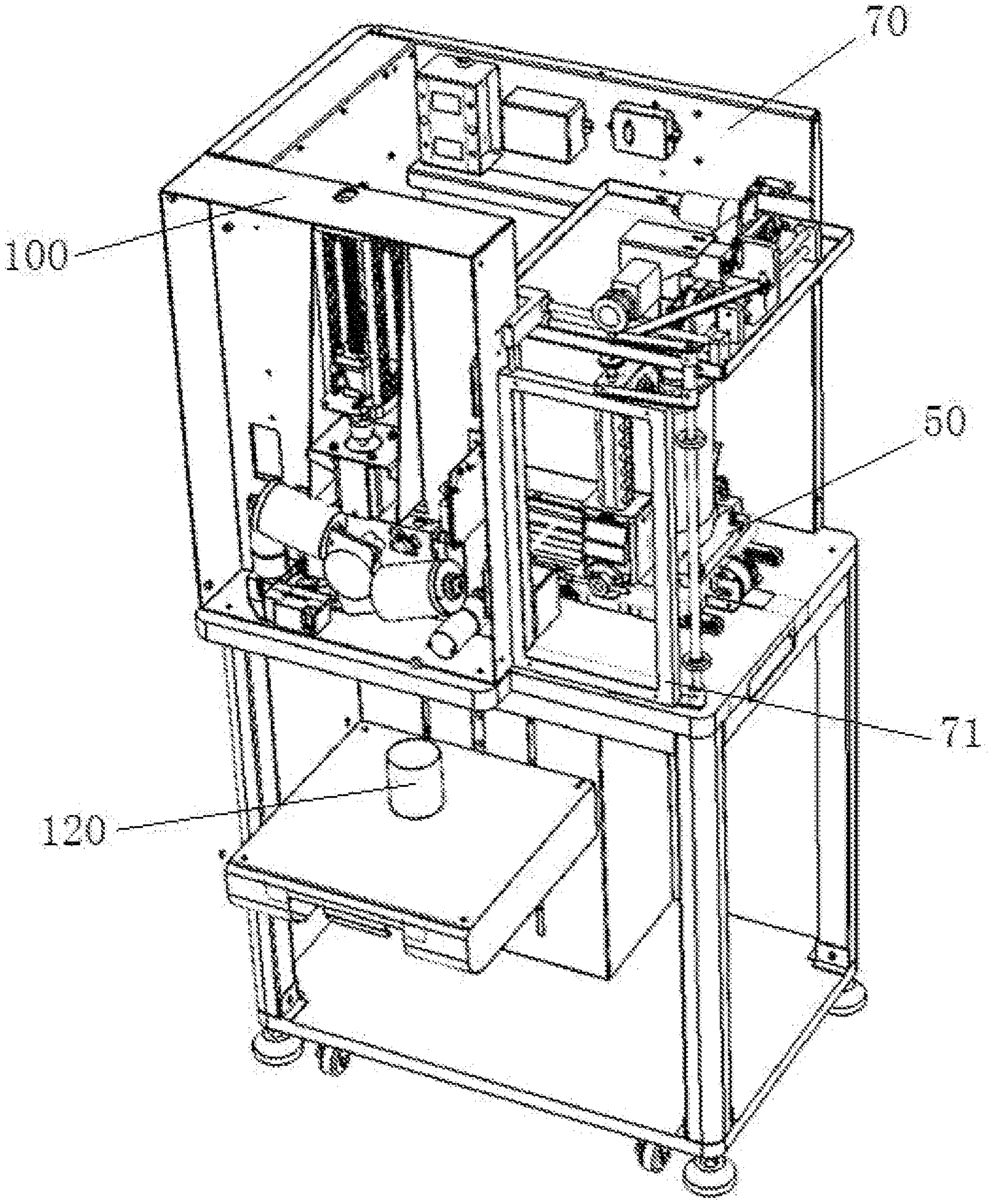
FIG. 7 shows a structural schematic view of a color matching apparatus provided according to an embodiment of the present disclosure.
Figure 15:
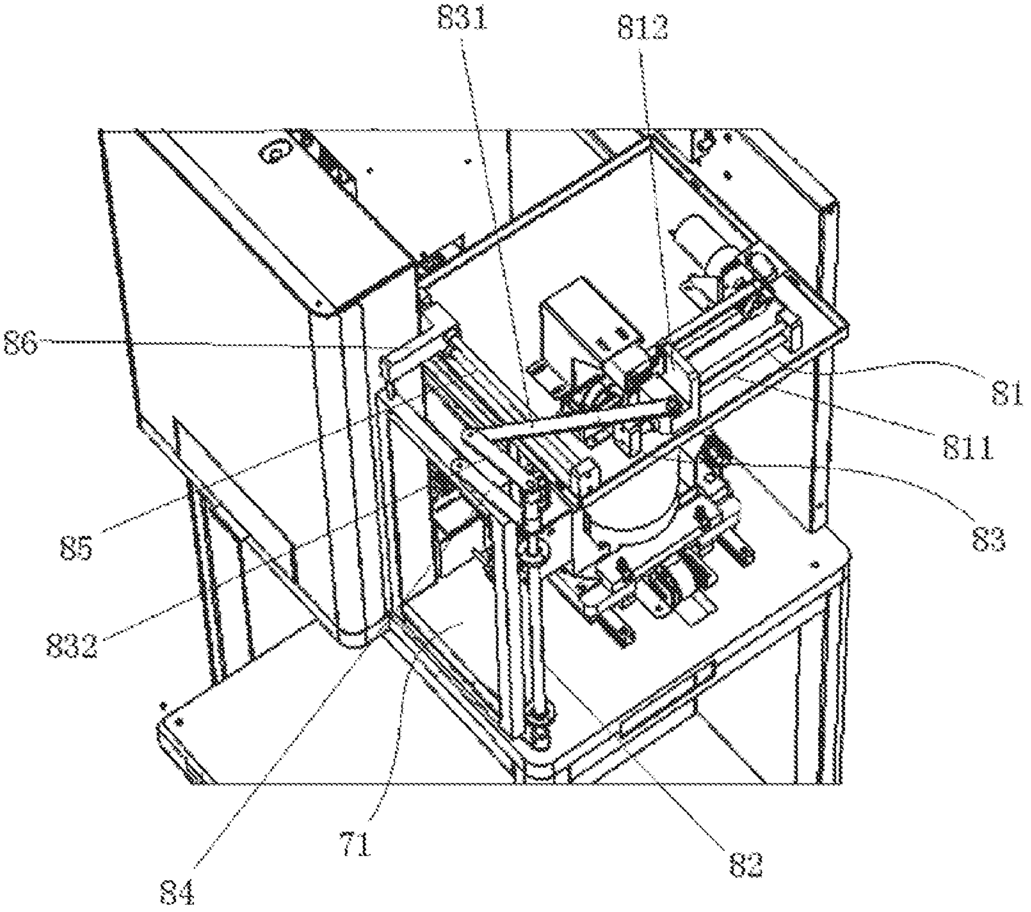
FIG. 15 shows a structural schematic view of an operation door of the color matching apparatus provided according to an embodiment of the present disclosure, being in a closed state.
Figure 16:
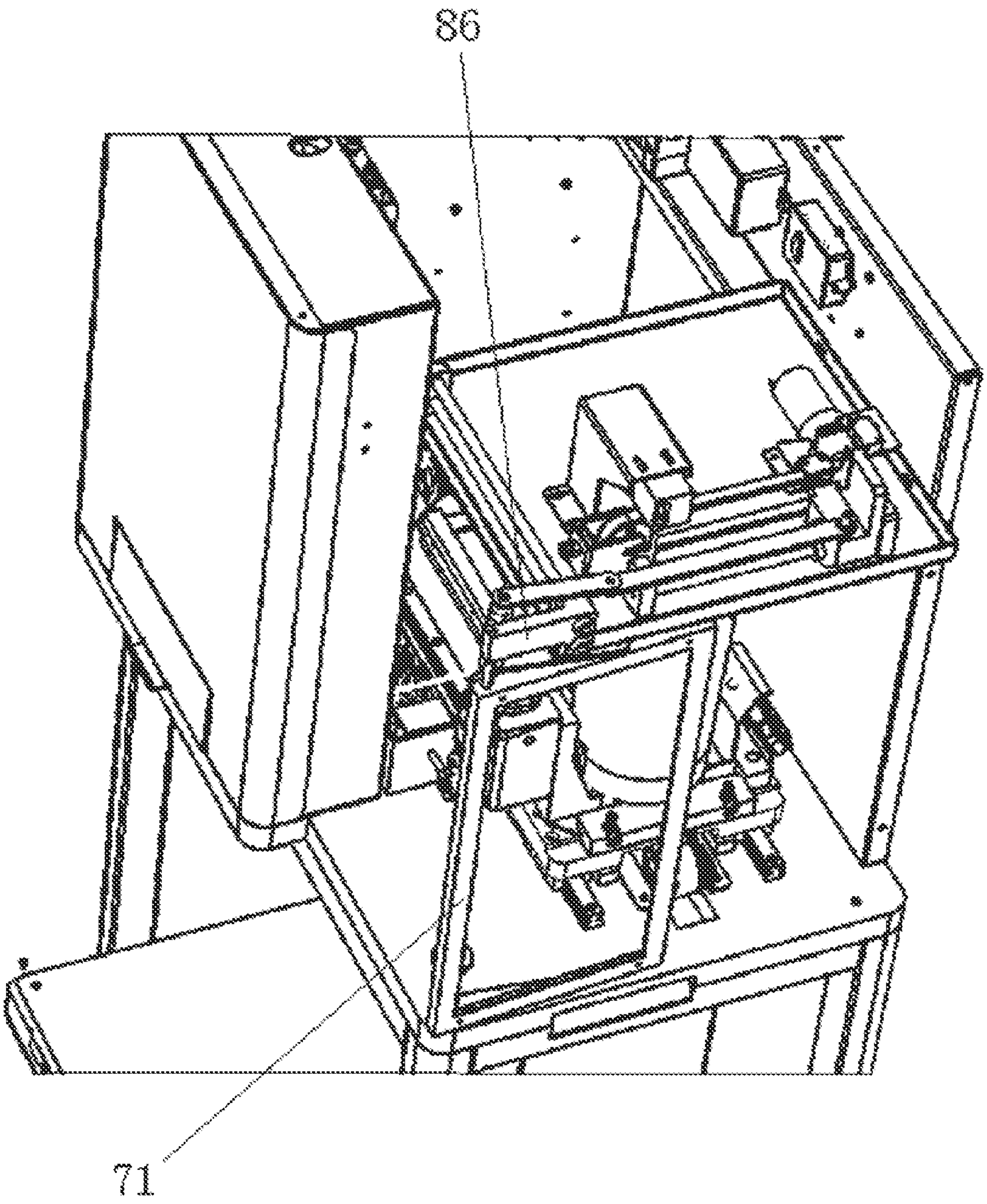
FIG. 16 shows a structural schematic view of the operation door of the color matching apparatus provided according to an embodiment of the present disclosure, being in an open state.
Figure 17:
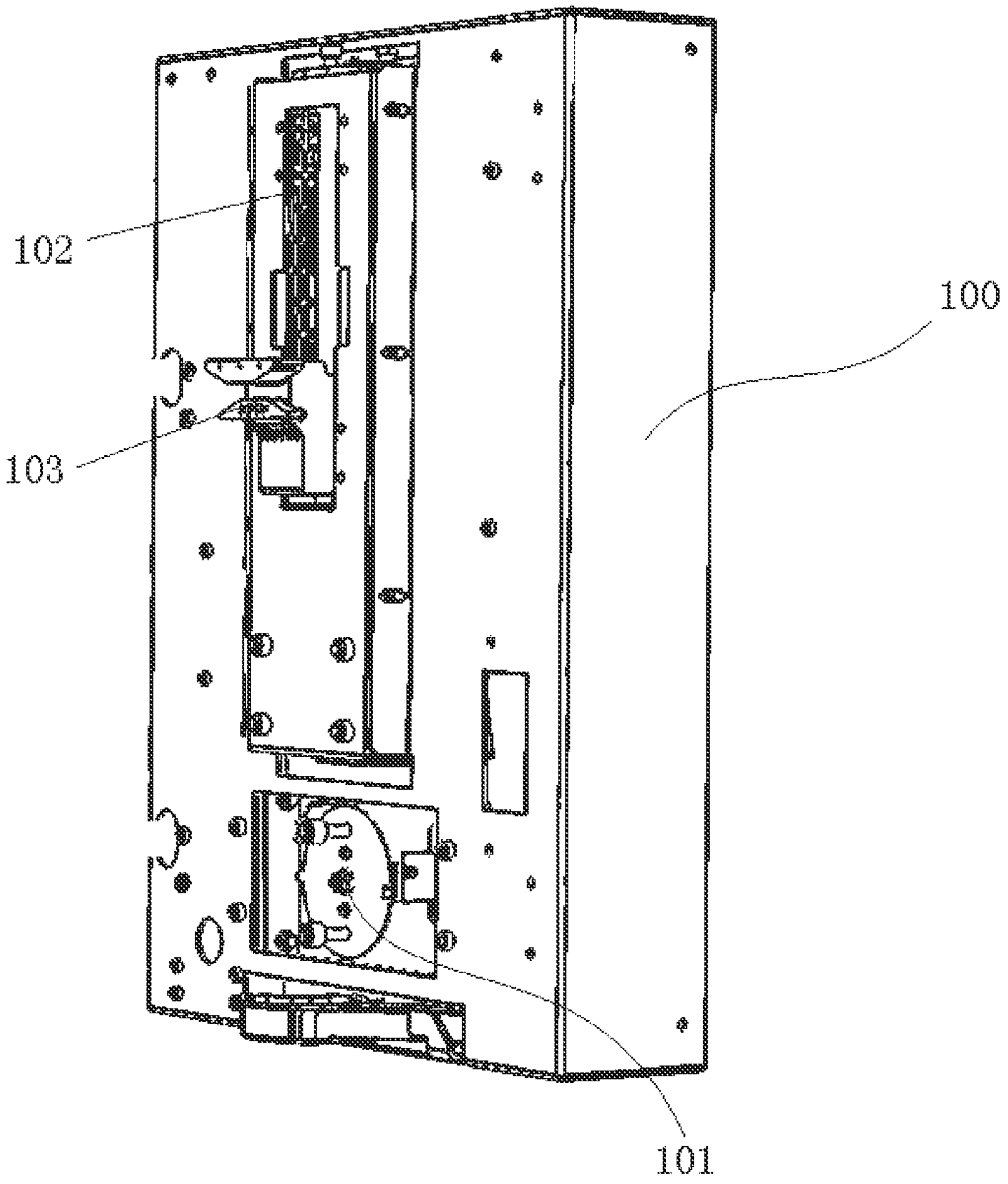
FIG. 17 shows a structural schematic view of the third driving portion of the color matching apparatus provided according to an embodiment of the present disclosure.
Figure 18:
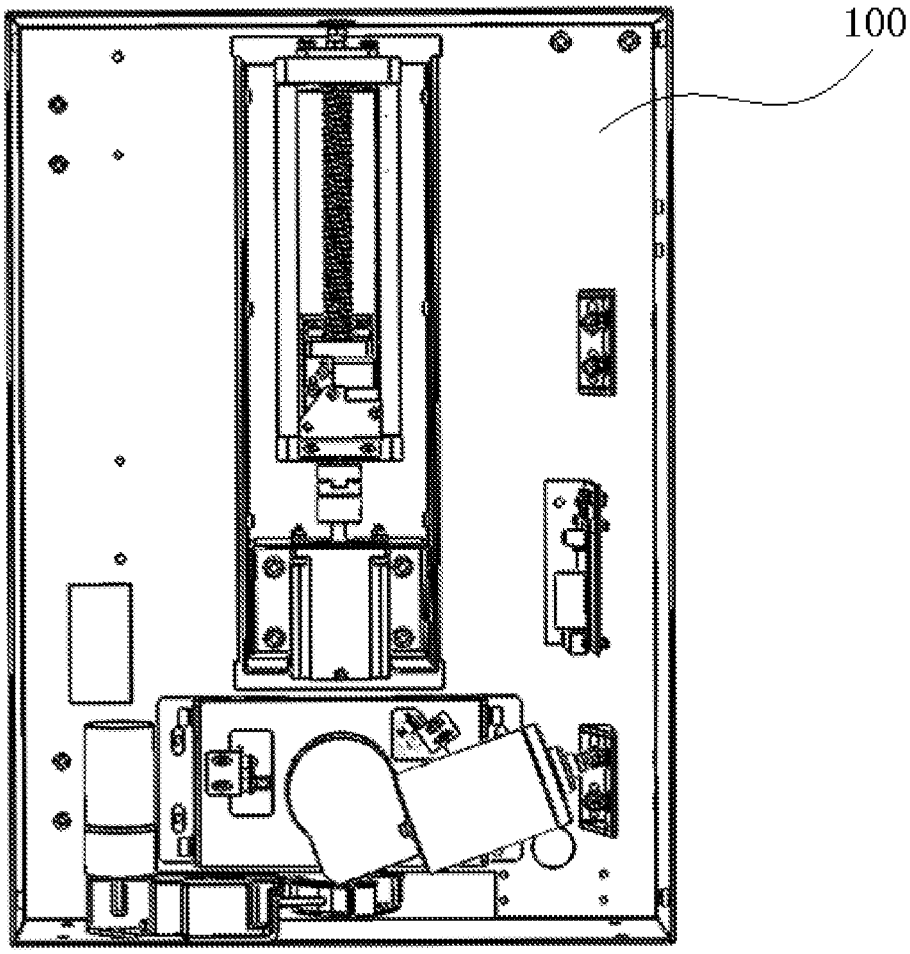
FIG. 18 shows another structural schematic view of the third driving portion of the color matching apparatus provided according to an embodiment of the present disclosure.

As shown in FIG. 7, FIG. 15, and FIG. 16, in order to provide a better working environment for paint mixing staff, the color matching apparatus further includes a housing 70, wherein the housing 70 is covered on the platform 40, and the protection performance of the apparatus can be improved by using the housing. In the above, the housing 70 has an operation door 71 provided corresponding to an assembling position, and the operation door 71 has an open state and a closed state provided relative to the housing 70. In the above, a sensor for open or closed state of the door is provided in the operation door 71, the sensor is connected to the control mechanism, and the control mechanism determines the open or closed state of the door by determining an electrical signal of the sensor, further controlling working processes of other appliances.

In the above, the color matching apparatus further includes a second driving portion 81, a rotating shaft 82, and a connecting rod mechanism 83. Specifically, the second driving portion 81 is movably provided on the housing 70, the rotating shaft 82 is rotatably provided on the housing 70, the rotating shaft 82 is in drive connection with the operation door 71, one end of the connecting rod mechanism 83 is hinged to the second driving portion 81, and the other end of the connecting rod mechanism 83 is connected to the rotating shaft 82. In the process that the second driving portion 81 moves relative to the housing, the second driving portion can drive the rotating shaft to rotate by using the connecting rod mechanism, and as the rotating shaft 82 is in drive connection with the operation door 71, the rotating shaft can further drive the operation door to switch between the open state and the closed state.

As shown in FIG. 15, the connecting rod mechanism 83 includes a first connecting rod 831 and a second connecting rod 832 hinged to each other, wherein one end of the first connecting rod 831 is hinged to a pushing member 812 of the second driving portion 81, and one end of the second connecting rod 832 is fixedly connected to the rotating shaft 82. In the process that the pushing member 812 of the second driving portion 81 moves relative to the housing, the pushing member 812 can drive the second connecting rod to rotate through the first connecting rod, and further drive the rotating shaft to rotate by using the second connecting rod.

In the present embodiment, the color matching apparatus further includes a third connecting rod 84, a first sliding rail 85, and a first sliding block 86. In the above, one end of the third connecting rod 84 is fixedly connected to the rotating shaft 82, the other end of the third connecting rod 84 is hinged to the operation door 71, and the rotating shaft is in drive connection with the operation door through the third connecting rod. By providing the first sliding rail 85 on the housing 70, and providing the first sliding block 86 slidably on the first sliding rail 85, as the first sliding block 86 is hinged to the operation door 71, in the process of movement of the operation door 71, the first sliding block 86 and the first sliding rail 85 cooperate with each other so as to limit the operation door 71 to make it move along a preset path, then the stability when the operation door moves can be improved.

As shown in FIG. 15, in the present embodiment, the second driving portion 81 includes a driving member, a second sliding rail 811, and a pushing member 812, the driving member and the second sliding rail are both provided on the housing, and the pushing member is slidably provided on the second sliding rail. Specifically, the pushing member is hinged to the connecting rod mechanism. In the above, the second sliding rail is perpendicular to the first sliding rail. In the present embodiment, the pushing member 812 is a sliding block. In other embodiments, the second driving portion can be replaced by a linear driving mechanism such as an air cylinder, a hydraulic cylinder, or a rack, as long as the second driving portion can be used to drive the connecting rod mechanism to move.

In the present embodiment, the operation door 71 includes a door frame and a door, the driving member includes a second driving wheel assembly and a second driven wheel assembly mounted on the top of the housing, the second driving wheel assembly is driven by a motor, a second synchronous belt is provided between the second driving wheel assembly and the second driven wheel assembly, the second synchronous belt is driven by the second driving wheel assembly, and the pushing member is connected to the second synchronous belt to form a whole.

As shown in FIG. 7, FIG. 8, FIG. 12, FIG. 17, and FIG. 18, the color matching apparatus further includes a pumping mechanism 90 and a third driving portion 100, wherein the pumping mechanism 90 is connected to the color masterbatch bucket 51, the pumping mechanism 90 is configured to pump out the paint in the color masterbatch bucket 51, the third driving portion 100 is provided on one side of the platform 40, the third driving portion 100 is in drive connection with the pumping mechanism 90, and the third driving portion 100 is configured to drive the pumping mechanism 90 to operate. In the above, the platform 40 has a liquid outlet window 41, the liquid outlet window 41 is provided corresponding to the liquid outlet position, and the paint pumped out by the color masterbatch bucket 51 can flow into a receiving device 120 through the liquid outlet window. In the present embodiment, a hole is provided at the liquid outlet position, the hole forms the liquid outlet window 41, the position of the receiving device 120 is below the hole, and the color masterbatch fed each time enters the receiving device 120 below through the hole.

In the present embodiment, the third driving portion 100 is located at a front side of a tail portion of the first guide rail 10, and the third driving portion 100 includes a frame, a valve motor is provided on the frame, a lever 101 is provided on the valve motor, the lever and the valve body lever are located on the same horizontal plane, when the color masterbatch bucket 51 is located at the liquid outlet position, the valve motor drives the lever to rotate from a vertical state to a horizontal state, the lever is combined with the valve body lever, and the lever continues to rotate so as to make the valve body lever rotate, thus controlling the paste outlet nozzle to be in communication or closed.

In the above, the frame is further provided with a linear driving mechanism 102, and the linear driving mechanism is provided with a pull rod head baffle 103 which moves up and down, when the color masterbatch bucket 51 moves to the liquid outlet position, the pull rod head baffle is just snapped with a pull plate at the top of the volumetric metering pump, and the pull rod head baffle drives a piston rod of the volumetric metering pump to move up and down. The linear driving mechanism is a lead screw nut mechanism (a linear moving unit such as an air cylinder, as long as the linear movement can be controllably completed). A lead screw driven by a stepper motor to rotate is provided on the frame, a nut is provided on the lead screw, the nut is connected to the pull rod head baffle, the pull rod head baffle includes a groove-type structure, a piston head of the volumetric metering pump, when moving with the color masterbatch bucket 51, moves away from or enters a groove located in the groove-type structure, the nut moves up and down such that the piston rod moves up and down, thus sucking the color masterbatch from the color masterbatch bucket 51 and ejecting the same.

In the present embodiment, the color masterbatch bucket 51 is connected to the volumetric metering pump through the valve body, a bucket cover is provided on the color masterbatch bucket 51, a pouring port is provided on the bucket cover, a pouring port cover is provided on the pouring port, the pouring port cover is slidably provided on the pouring port, the pouring port cover is connected to a clasp, a compression spring making the pouring port cover in a closed state is provided between the clasp and the bucket cover, a connecting member is provided between an upper part of the color masterbatch bucket 51 and the volumetric metering pump so that the volumetric metering pump forms a handle of the color masterbatch bucket 51, the clasp is located on one side of the bucket cover close to the volumetric metering pump, and a stirring device is provided in the color masterbatch bucket 51. In the above, refer to patent CN 209061071 U for a specific structure of the color masterbatch bucket 51.

Figure 8:
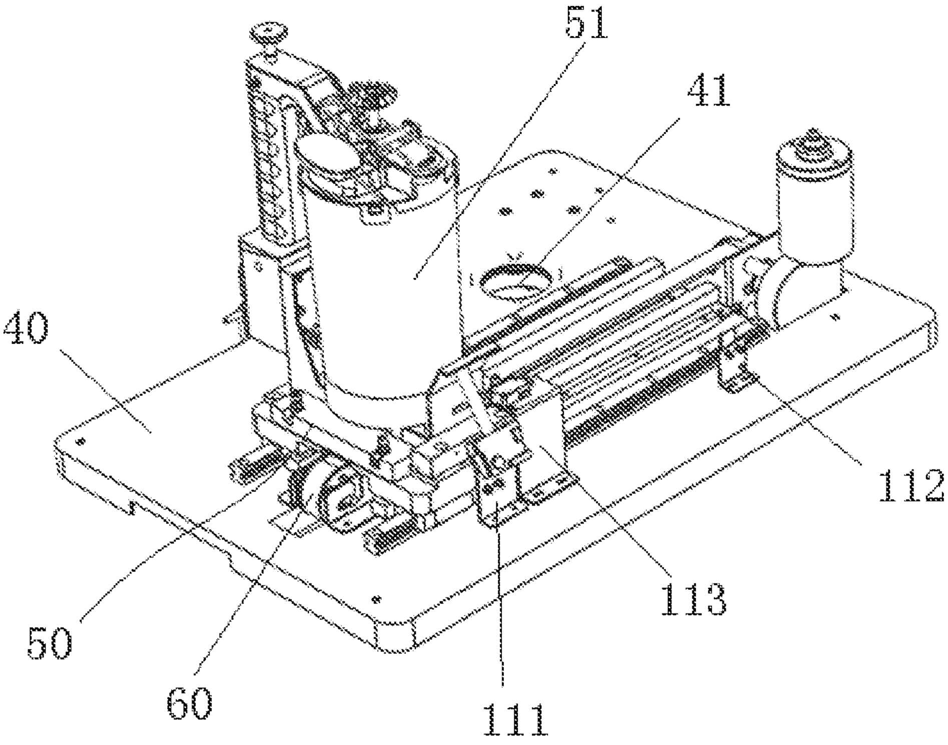
FIG. 8 shows a schematic view of the compression module of the color matching apparatus provided according to an embodiment of the present disclosure, located in an assembling position.
Figure 9:
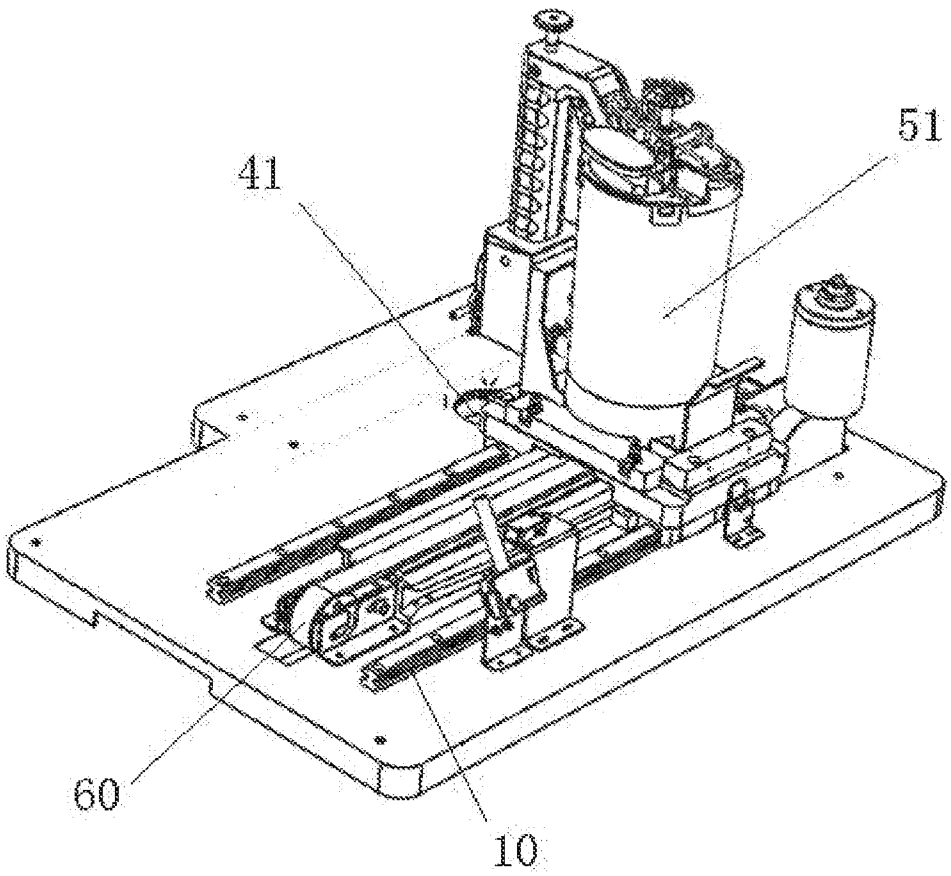
FIG. 9 shows a schematic view of the compression module of the color matching apparatus provided according to an embodiment of the present disclosure, located in a liquid outlet position.
Figure 10:
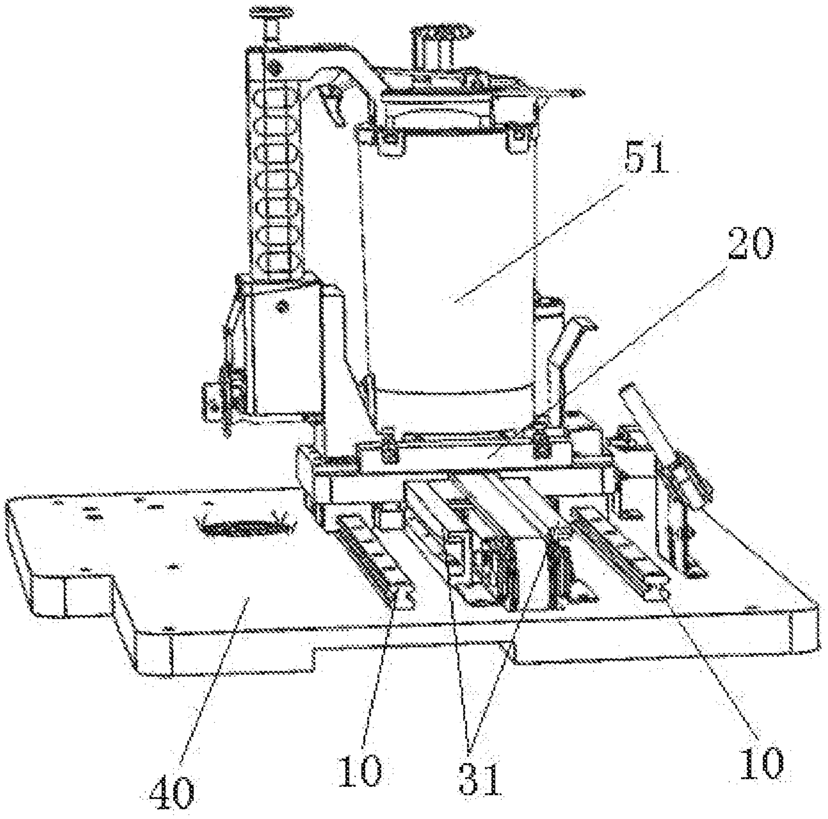
FIG. 10 shows an assembling view of the conveying apparatus provided according to an embodiment of the present disclosure and a platform.
Figure 11:
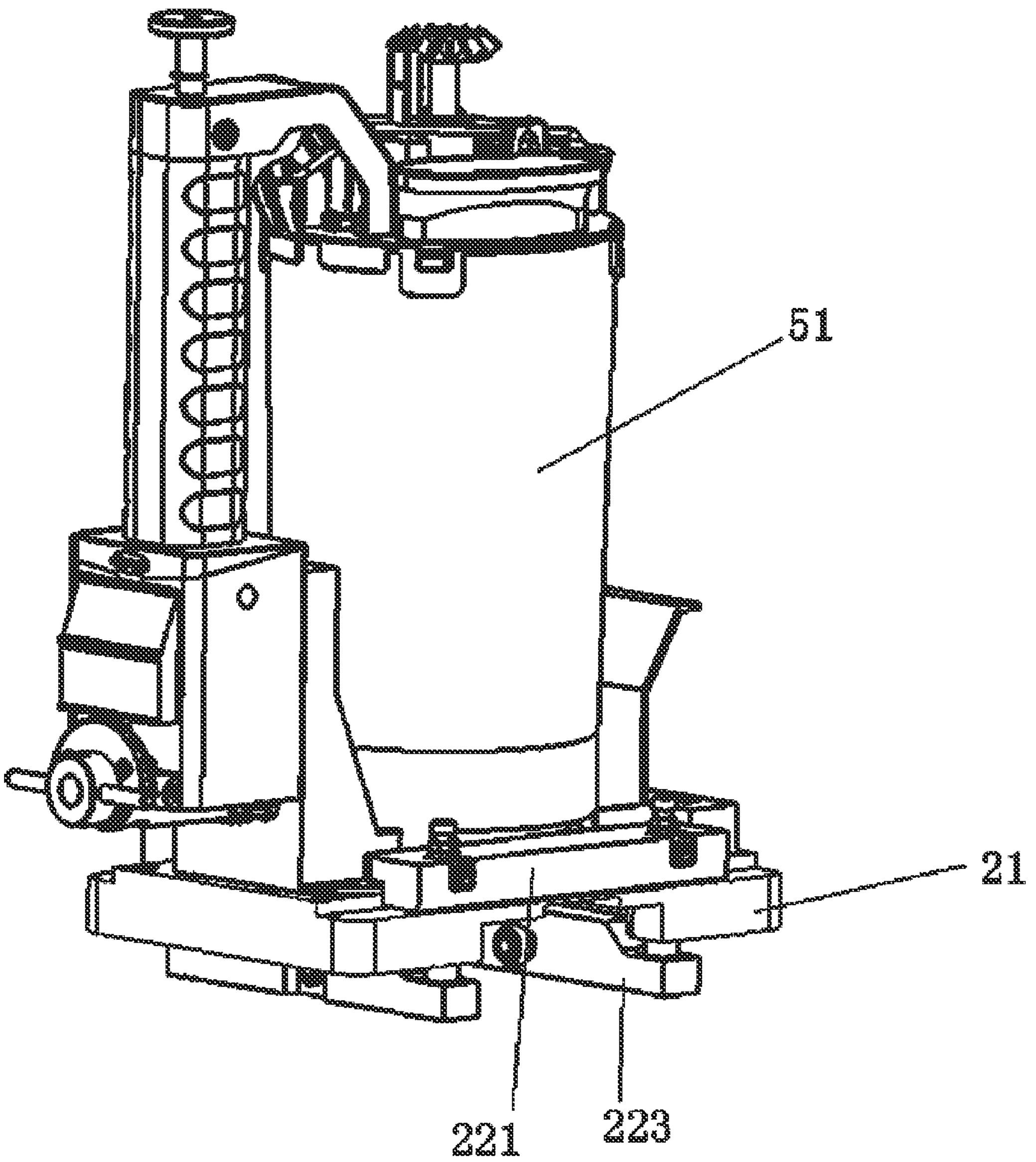
FIG. 11 shows an assembling view of the compression module and a color masterbatch bucket, provided according to an embodiment of the present disclosure.
Figure 12:
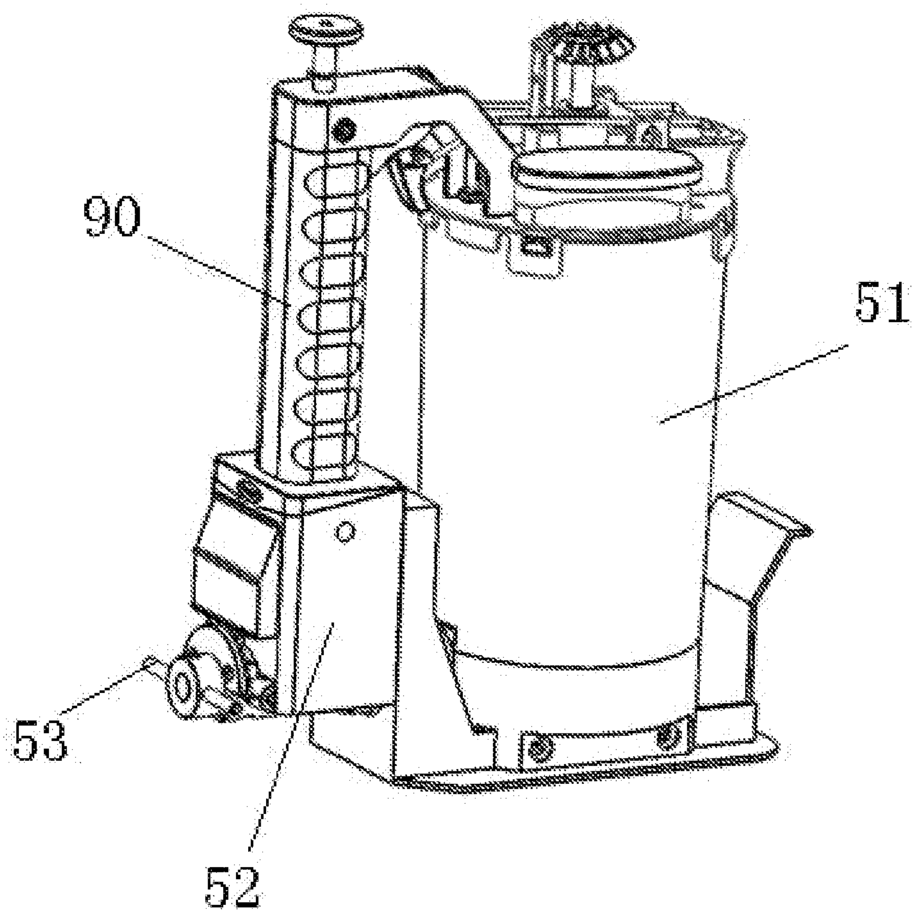
FIG. 12 shows an assembling view of the color masterbatch bucket and a pumping mechanism, provided according to an embodiment of the present disclosure.
Figure 13:
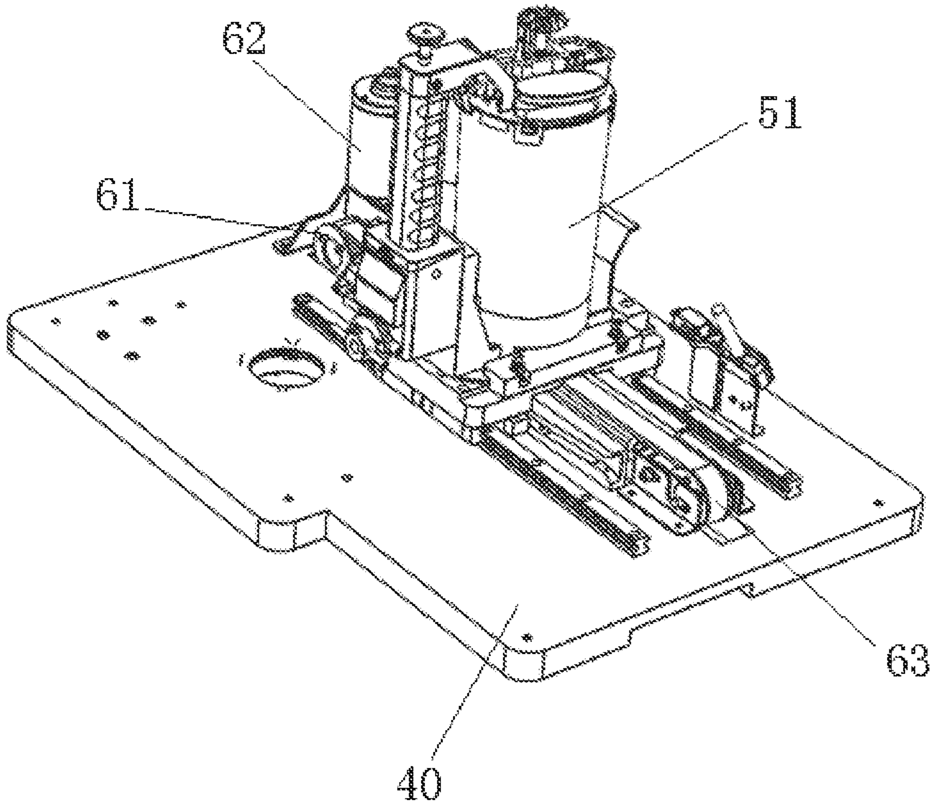
FIG. 13 shows another assembling view of the conveying apparatus provided according to an embodiment of the present disclosure and the platform.
Figure 14:
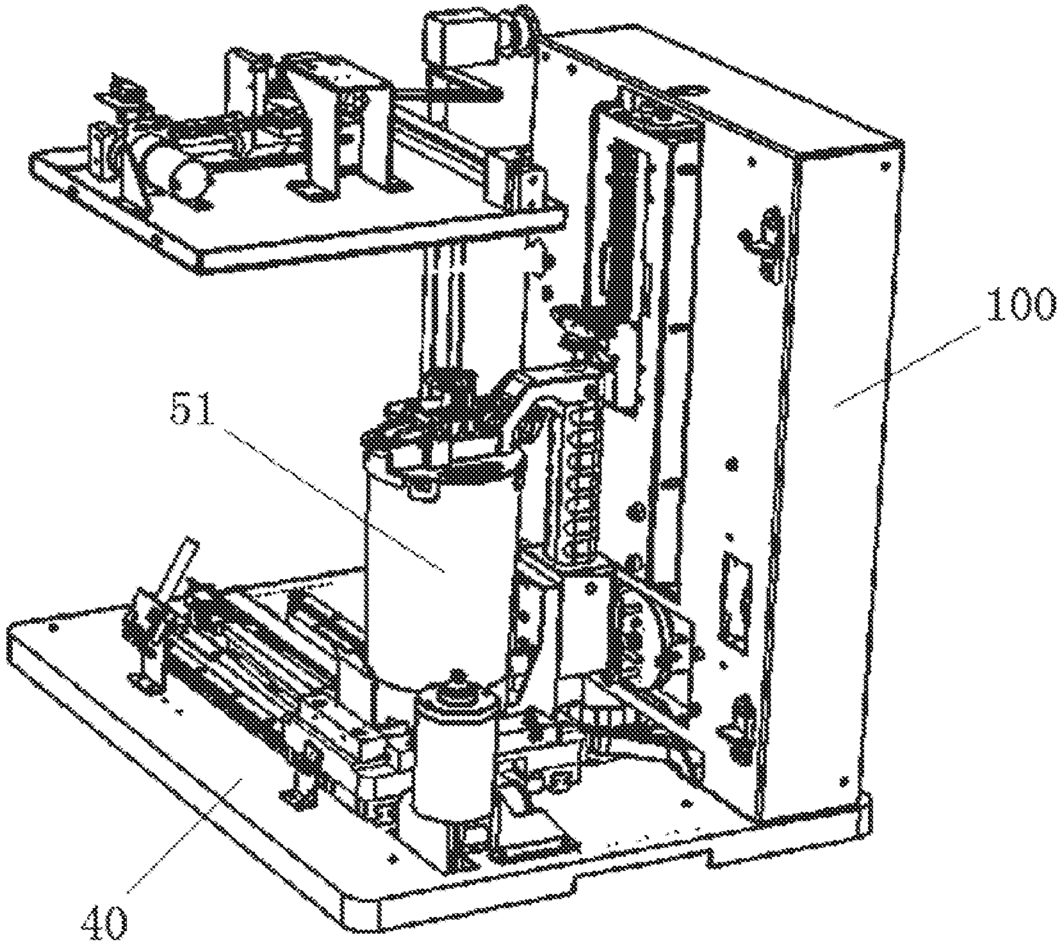
FIG. 14 shows an assembling view of a third driving portion and the platform, provided according to an embodiment of the present disclosure.

As shown in FIG. 8, in order to enable the control mechanism to determine positions of the compression module 20 and the color masterbatch bucket 51, a working order and a working duration of each electric appliance in the apparatus are controlled comprehensively, an assembling position sensor 111, a liquid outlet position sensor 112, and a bucket detection sensor 113 are mounted on the platform 40, wherein the assembling position sensor and the liquid outlet position sensor are located at two ends of the first guide rail 10, respectively, the bucket detection sensor is located between the above two sensors, the bucket detection sensor is closer to the assembling position sensor. The above sensors are respectively electrically connected to the control mechanism. The assembling position sensor is configured to detect whether the compression module 20 is located at the assembling position, and the liquid outlet position sensor is configured to detect whether the compression module 20 is located at the liquid outlet position, and the bucket detection sensor is configured to detect whether the color masterbatch bucket 51 is clamped in place in the compression module 20. In the present embodiment, the bucket detection sensor is a micro-switch, and a support is provided between this sensor and the platform 40. In other embodiments, the support may not be provided, and the support is mounted only for realizing the function.

In the present embodiment, a code scanning device is provided on the color matching apparatus, and the code scanning device is provided on the frame, so as to identify a label on the color masterbatch bucket 51. (The code scanning device also may be provided at other positions, and the purpose of the code scanning device is to enable the control mechanism to determine whether the color masterbatch bucket 51 is the color masterbatch bucket 51 required in the program). By recognizing whether the color masterbatch bucket 51 loaded into the apparatus is a desired color masterbatch bucket 51 or not, the control mechanism controls the next operation comprehensively.

In the present embodiment, a cleaning box is provided on the platform 40, a brush assembly is provided in the cleaning box, the brush assembly includes a brush shaft and a brush, the brush shaft is a driven shaft, the cleaning box is located between the paste outlet nozzle and the liquid outlet position, and is a must-be-passed position for the color masterbatch bucket 51. When one injecting process is completed, the first driving portion 60 drives the color masterbatch bucket 51 on the compression module 20 to move from the liquid outlet position to the assembling position, the paste outlet nozzle comes into contact with the brush, and the brush cleans the paste outlet nozzle to avoid drying of residual color paste. (Certainly, the brush shaft also may be configured as a driving wheel driven by a power source, and this design manner will improve the cleaning effect but increase the design difficulty and manufacturing cost).

In the present embodiment, the frame is further provided with a movable drip receiving box which is located above the liquid outlet position and below the paste outlet nozzle, and the drip receiving box includes a drip receiving station located right below the paste outlet nozzle and an avoidance station which avoids the position of the paste outlet nozzle. A linear moving mechanism is provided on the frame, for example, a motor drives a gear, the gear rotates to drive the rack to move, and the drip receiving box is connected to the rack to move together. Alternatively, an air cylinder is provided on the frame, and a piston rod of the air cylinder drives the drip receiving box to move together. After the injecting channel is closed, that is, after the paste outlet nozzle does not discharge the paste any more, there may be residual color paste. The drip receiving box is provided, then after the injecting channel is closed, the drip receiving box moves to right below the paste outlet nozzle to prevent the residual color paste from dripping into the receiving device to affect the accuracy.

In the present embodiment, the color matching apparatus further includes a driving bevel gear provided at the top of the apparatus, the driving bevel gear is driven by a power source which is a motor, a stirring device is provided in the color masterbatch bucket 51, a bevel gear is provided at the top of the stirring device, the bevel gear extends out above the bucket cover, and the driving bevel gear is meshed with the bevel gear on the color masterbatch bucket 51 to drive the stirring device to rotate.

Specifically, one end of the stirring device is a stirring shaft extending into the color masterbatch bucket 51, a stirring blade is provided on the stirring shaft, one end of the stirring device located outside the color masterbatch bucket 51 is connected to the bevel gear, and the bevel gear is located above the bucket cover. When the color masterbatch bucket 51 is located at the liquid outlet position, the driving bevel gear and the bevel gear are meshed with each other in spatial positions, and the stirring device is driven by the motor and the gear mechanism to rotate and stir in the color masterbatch bucket 51. The stirring blade is spiral stirring blade, is a kind of bubble-cutting blade, and can throw color masterbatch slurry onto the bucket wall during the stirring, and throw out or break the bubbles, which facilitates volume metering.

A working process of the present color matching apparatus is as follows: the color masterbatches in the formula are fed one by one, one color masterbatch bucket 51 is placed in the apparatus at one time, and after the feeding of one color masterbatch is completed, another color masterbatch bucket 51 is placed on the apparatus for feeding. The above steps are repeated, and after the required color masterbatches are fed successively, manual stirring is performed in a color matching bucket (the receiving device), so that an automobile paint of a required color can be obtained. Specific actions of the color matching apparatus are as follows:

(1) initialization actions are performed after start-up. The door in the operation door 71 is closed, after the compression module 20 moves to the assembling position of the first guide rail 10, the assembling position sensor transmits position information about the compression module 20 to the control mechanism, and then the control mechanism controls the door in the operation door 71 to be opened, and all motors in the apparatus are powered off;

(2) according to the requirements of the automobile paint to be prepared, the color masterbatch buckets 51 loaded with different color masterbatches are sequentially mounted on the compression module 20. The color masterbatch bucket 51 is manually mounted on the compression module 20, and when the lug at the bottom of the color masterbatch bucket 51 is mounted on the snap-fitting structure (the gap between the first compression block and the base) of the compression module 20, the bucket detection sensor is configured to detect whether the color masterbatch bucket 51 is mounted in position, after the color masterbatch bucket 51 is mounted in position, the control mechanism controls the operation door 71 to be closed, and after the door is closed, the door and an internal interlock switch on the door frame are closed, and all the motors in the apparatus are powered on;

(3) the color masterbatch bucket 51 starts to move towards the liquid outlet position along the first guide rail, and when the liquid outlet position sensor detects that the compression module 20 arrives at the liquid outlet position, the piston head enters the groove located in the groove-type mechanism at this working position. Meanwhile, the code scanning device scans code of the color masterbatch bucket 51, and judges whether the color masterbatch bucket 51 is pigment in the formula and does not repeat colors previously dispensed according to the formula, then the third driving portion 100 moves, the valve motor drives the lever to move, the lever is combined with the valve body lever, and the lever rotates to make the valve body lever rotate, so that the paste outlet nozzle is in communication, so as to carry out the feeding; if the information obtained by the code scanning does not conform to correct information in the program, the control mechanism reports an error, and the color masterbatch bucket 51 moves back to an origin and waits for error correction;

(4) when a feeding amount of this color masterbatch reaches the required amount, the control mechanism drives the valve motor to rotate reversely, the valve motor drives the lever to move reversely, and the lever rotates so that the valve body lever rotates reversely, thus controlling the paste outlet nozzle to be closed;

(5) after the paste outlet nozzle is closed, the drip receiving box is driven by the linear moving mechanism to move from the avoidance station to the drip receiving station. The drip receiving box is provided, such that after the injecting channel is closed, the drip receiving box moves to right below the paste outlet nozzle to prevent the residual color paste from dripping into the receiving device to affect the accuracy;

(6) after the drip receiving box enters the drip receiving station, the compression module 20 moves towards the assembling position of the first guide rail 10 under the traction of the first driving portion 60, the paste outlet nozzle passes through the cleaning box during the movement of the compression module 20, the paste outlet nozzle of the color masterbatch bucket 51 is in contact friction with the brush, and the brush cleans the paste outlet nozzle to avoid drying of residual color paste; and (7) finally, the compression module 20 returns to the assembling position, the motors in the apparatus are powered off, the door of the operation door 71 is opened, the worker takes out the color masterbatch bucket 51, and puts the next color masterbatch bucket 51 according to program prompt. The above working process is repeated. When all the color masterbatch buckets 51 are completely fed, the color masterbatches in the color matching bucket are stirred to obtain the desired automobile paint.

The apparatus provided in the present embodiment has the following beneficial effects.

(1) By switching the states of the compression module 20 through the limiting structure 30, it is convenient to disassemble and assemble the color masterbatch bucket 51, without the need of waiting the color masterbatch bucket 51 to move to the assembling position and stop stably and then using a dedicated dismantling mechanism for disassembling and assembling, which can improve the disassembling and assembling efficiency.

(2) By using the volumetric metering of the color masterbatch bucket 51, including connecting the volumetric metering pump to the color masterbatch bucket 51 to realize the injecting of a fixed volume of color paste, the color paste can be automatically dispensed. By using the method of volumetric dispensing and volumetric color matching, the cost is effectively reduced.

(3) By making a single color masterbatch bucket 51 move linearly on the first guide rail 10, the structure of the apparatus is simplified, the equipment cost is reduced, and the volume of the apparatus is greatly reduced, being commercially more suitable for small and medium-sized stores, thereby having a very good market prospect.

It should be noted that the terms used herein are only for the purpose of describing particular embodiments, but are not intended to limit exemplary embodiments in accordance with the present disclosure. As used herein, the singular form is also intended to include the plural form as well, unless clearly indicated otherwise in the context, and further it also should be understood that when the terms "contain" and/or "include" are used in the description, they indicate the presence of the feature, step, operation, device, component, and/or a combination thereof.

The above-mentioned are merely for preferred embodiments of the present disclosure and not used to limit the present disclosure. For one skilled in the art, various modifications and changes may be made to the present disclosure. Any modifications, equivalent substitutions, improvements and so on, within the spirit and principle of the present disclosure, should be covered within the scope of protection of the present disclosure.

What is claimed is:

1. A conveying apparatus, wherein the conveying apparatus comprises:

a first guide rail, comprising a first section and a second section connected to each other;

a compression module, which can be provided on the first guide rail in a manner of being movably fitted along the first guide rail, wherein the compression module comprises a base and a compression assembly with adjustable relative positions, the compression assembly is provided on the base, the compression assembly and the base have a gap therebetween, the compression module has a to-be-assembled state and a compression state which are oppositely arranged, and when the compression module is in the compression state, the gap is decreased so as to clamp a clamped member; and a limiting structure, configured to adjust the gap between the compression assembly and the base, in a process that the compression module moves from the first section to the second section, a state of the compression module is switched through the limiting structure, and when the compression module is located at the first section, the compression module is in the to-be-assembled state, and when the compression module is located at the second section, the compression module is in the compression state;

wherein the limiting structure comprises a second guide rail and a limiting member, the first guide rail and the second guide rail are provided in the same direction, the second guide rail is provided with a first sliding groove, the limiting member is provided in the first sliding groove, the base is provided on the first guide rail, and the limiting member is connected to the compression assembly.

2. The conveying apparatus according to claim 1, wherein the first sliding groove is provided on a side wall of the second guide rail, and a height of the first sliding groove relative to the first section is greater than a height of the first sliding groove relative to the second section.

3. The conveying apparatus according to claim 1, wherein the compression assembly comprises:

a first compression member, located on one side of the base, and the first compression member and the base having the gap therebetween;

a connecting member, provided on the base in a penetrating manner, one end of the connecting member being connected to the first compression member; and a second compression member, located on the other side of the base, wherein the other end of the connecting member is connected to the second compression member, and the limiting member is provided on the second compression member.

4. The conveying apparatus according to claim 3, wherein the first compression member and the connecting member have an adjusting structure therebetween, and the adjusting structure is configured to adjust the gap between the first compression member and the base.

5. The conveying apparatus according to claim 4, wherein the adjusting structure comprises:

a waist-shaped hole, provided on the connecting member, wherein the waist-shaped hole extends along a lengthwise direction of the connecting member;

a fixing member, passing through the waist-shaped hole and connected to the first compression member; and an adjusting member, wherein the connecting member has a mounting hole, and an extending direction of the mounting hole is the same as an extending direction of the connecting member, the adjusting member is provided in the mounting hole in a penetrating manner, an end portion of the adjusting member abuts against the fixing member so as to limit a relative position of the fixing member in the waist-shaped hole.

6. The conveying apparatus according to claim 5, wherein the base is provided thereon with a second sliding groove, and the base is clamped in the first guide rail through the second sliding groove.

* * * * *